(12) United States Patent  
Fukuyama

(10) Patent No.: US 10,108,008 B2  
(45) Date of Patent: Oct. 23, 2018

(54) IMAGE-FORMING OPTICAL SYSTEM, ILLUMINATION APPARATUS, AND OBSERVATION APPARATUS

(71) Applicant: OLYMPUS CORPORATION, Tokyo (JP)

(72) Inventor: Hiroya Fukuyama, Machida (JP)

(73) Assignee: OLYMPUS CORPORATION, Tokyo (JP)

( * ) Notice: Subject to any disclaimer, the term of this patent is extended or adjusted under 35 U.S.C. 154(b) by 315 days.

(21) Appl. No.: 14/873,592

(22) Filed: Oct. 2, 2015

(65) Prior Publication Data

US 2016/0025970 A1 Jan. 28, 2016

Related U.S. Application Data

(63) Continuation of application No. PCT/JP2014/059757, filed on Apr. 2, 2014.

(30) Foreign Application Priority Data

Apr. 3, 2013 (JP) .................................. 2013-077900

(51) Int. Cl.
G02F 1/01 (2006.01)
G02B 27/00 (2006.01)
(Continued)

(52) U.S. Cl.
CPC ......... G02B 27/0068 (2013.01); G02B 13/22 (2013.01); G02B 21/0032 (2013.01);
(Continued)

(58) Field of Classification Search
CPC .......... G02B 3/08; G02B 5/1861; G02B 5/18; G02B 5/1866; G02B 5/1876;
(Continued)

(56) References Cited

U.S. PATENT DOCUMENTS 5,442,413 A 8/1995 Tejima et al.
5,986,744 A 11/1999 Kudo et al.
(Continued)

FOREIGN PATENT DOCUMENTS

EP 2 570 852 A2 3/2013
JP 6-265814 A 9/1994
(Continued)

OTHER PUBLICATIONS

International Search Report dated Jul. 8, 2014 issued in PCT/JP2014/059757.
(Continued)

*Primary Examiner* — Evelyn A Lester
(74) *Attorney, Agent, or Firm* — Scully, Scott, Murphy & Presser, P.C.

(57) ABSTRACT

An image-forming optical system includes a plurality of image-forming lenses that form a final image and at least one intermediate image; a first phase modulator that is disposed closer to an object side than any one of the intermediate images formed by the image-forming lenses and that applies a spatial disturbance to a wavefront of light coming from the object; and a second phase modulator that is disposed at a position that sandwiches at least one of the intermediate images with the first phase modulator and that cancels out the spatial disturbance applied to the wavefront of the light coming from the object by the first phase modulator.

2 Claims, 27 Drawing Sheets

(51) Int. Cl.
*G02B 13/22* (2006.01)
*G02B 21/00* (2006.01)
*G02B 21/04* (2006.01)
*G02B 21/36* (2006.01)
G02B 3/08 (2006.01)
G02B 5/18 (2006.01)
G02B 13/08 (2006.01)
G02B 26/06 (2006.01)

(52) U.S. Cl.
CPC ......... *G02B 21/0072* (2013.01); *G02B 21/04* (2013.01); *G02B 21/361* (2013.01); *G02B 27/0037* (2013.01); *G02B 3/08* (2013.01); *G02B 5/18* (2013.01); *G02B 5/1861* (2013.01); *G02B 5/1866* (2013.01); *G02B 5/1871* (2013.01); *G02B 5/1876* (2013.01); *G02B 13/08* (2013.01); *G02B 26/06* (2013.01); *G02F 1/01* (2013.01); *G02F 2203/50* (2013.01)

(58) Field of Classification Search
CPC .... G02B 27/0068; G02B 26/06; G02B 13/08; G02B 5/1871; G02F 2203/50; G02F 1/01
USPC ....... 359/569, 571, 656, 668, 679, 724, 741, 359/742, 279, 300
See application file for complete search history.

(56) References Cited

U.S. PATENT DOCUMENTS

| | | | |
|---|---|---|---|
| 6,577,429 B1 * | 6/2003 | Kurtz | G02B 27/48 355/53 |
| 6,774,944 B1 | 8/2004 | Fukuyama | |
| 2001/0004301 A1 | 6/2001 | Kodama et al. | |
| 2003/0063379 A1 | 4/2003 | Fukuyama et al. | |
| 2003/0147147 A1 | 8/2003 | Kodama et al. | |
| 2004/0150879 A1 | 8/2004 | Araki et al. | |
| 2004/0201885 A1 | 10/2004 | Fukuyama et al. | |
| 2006/0007534 A1 | 1/2006 | Fukuyama et al. | |
| 2008/0123069 A1 | 5/2008 | Wabra et al. | |
| 2010/0053735 A1 | 3/2010 | Wilson et al. | |
| 2012/0033296 A1 | 2/2012 | Wabra et al. | |
| 2012/0062986 A1 | 3/2012 | Wilson et al. | |
| 2013/0070217 A1 | 3/2013 | Tatsuno | |
| 2013/0215502 A1 | 8/2013 | Wilson et al. | |
| 2015/0138625 A1 | 5/2015 | Tatsuno | |

FOREIGN PATENT DOCUMENTS

| | | |
|---|---|---|
| JP | 11-109243 A | 4/1999 |
| JP | 11-326860 A | 11/1999 |
| JP | 2001-166226 A | 6/2001 |
| JP | 2002-196246 A | 7/2002 |
| JP | 2004-341394 A | 12/2004 |
| JP | 4011704 B2 | 11/2007 |
| JP | 2008-502012 A | 1/2008 |
| JP | 2008-113860 A | 5/2008 |
| JP | 2008-245157 A | 10/2008 |
| JP | 2009-58776 A | 3/2009 |
| JP | 2010-513968 A | 4/2010 |
| JP | 2013-033283 A | 2/2013 |
| JP | 2013-83817 A | 5/2013 |
| WO | 2008/078083 A1 | 7/2008 |

OTHER PUBLICATIONS

Japanese Office Action dated Oct. 24, 2017 received in JP 2015-510116.
Partial Supplementary European Search Report dated Nov. 9, 2016 in related European Patent Application No. 14 77 8041.5.

* cited by examiner

IMAGE-FORMING OPTICAL SYSTEM, ILLUMINATION APPARATUS, AND OBSERVATION APPARATUS

CROSS-REFERENCE TO RELATED APPLICATIONS

This is a continuation of International Application PCT/JP2014/059757, with an international filing date of Apr. 2, 2014, which is hereby incorporated by reference herein in its entirety. This application claims the benefit of Japanese Patent Application No. 2013-077900, the content of which is incorporated herein by reference.

TECHNICAL FIELD

The present invention relates to an image-forming optical system, an illumination apparatus, and an observation apparatus.

There is a known method of moving a focal-point position in an optical-axis direction by adjusting an optical-path length at an intermediate-image position (for example, see Patent Literature 1).

CITATION LIST

Patent Literature

{PTL 1} Publication of Japanese Patent No. 4011704

SUMMARY OF INVENTION

With the method of Patent Literature 1, because a flat mirror is disposed at the intermediate-image plane, blemishes or foreign objects on the surface of the flat mirror are superimposed on an image. In addition, when applied to a microscope optical system, because it is a magnifying optical system, the longitudinal magnification thereof is equal to the square of the lateral magnification, and thus, even with a slight movement of the focal-point position in the optical-axis direction, an intermediate image is moved by a large amount in that optical-axis direction. As a result, when the moved intermediate image is superimposed on a lens positioned in front of or behind it, similarly to the situation described above, blemishes or foreign objects on the lens surface or defects or the like in the lens are superimposed on the image.

An aspect of the present invention is an image-forming optical system including a plurality of image-forming lenses that form a final image and at least one intermediate image; a first phase modulator that is disposed closer to an object than any one of the intermediate images formed by the image-forming lenses and that applies a spatial disturbance to a wavefront of light coming from the object; and a second phase modulator that is disposed at a position that sandwiches at least one of the intermediate images with the first phase modulator and that cancels out the spatial disturbance applied to the wavefront of the light coming from the object by the first phase modulator.

In this specification, two concepts about the form of an image, namely, "sharp image" and "unsharp image" (or "unfocused image") will be used.

First, a "sharp image" is an image that is generated via an image-forming lens in a state in which a spatial disturbance is not applied to the wavefront of the light emitted from the object or in a state in which a disturbance that is applied once is cancelled out and eliminated, and refers to an image having a spatial frequency band determined by the wavelength of the light and the numerical aperture of the image-forming lens, a spatial frequency band based thereon, or a desired spatial frequency band in accordance with the purpose.

Next, an "unsharp image" (or an "unfocused image") is an image that is generated via an image-forming lens in a state in which a spatial disturbance is applied to the wavefront of the light emitted from the object, and refers to an image having properties such that a final image is formed so as to include practically no blemishes, foreign objects, defects or the like that exist on a surface of or inside an optical element disposed in the vicinity of that image.

An "unsharp image" (or an "unfocused image") formed in this way differs from a simple out-of-focus image in that, including an image at a position at which the image was originally supposed to be formed (that is, a position at which the image would be formed if the spatial disturbance were not applied to the wavefront), an unsharp image does not have a clear peak of the image contrast over a large area in the optical-axis direction and that the spatial frequency band thereof will always be narrower as compared with the spatial frequency band of a "sharp image".

The following descriptions are based on the above-described concepts of the "sharp image" and the "unsharp image" (or the "unfocused image") in this specification.

In the above-described aspect, the first phase modulator and the second phase modulator may be disposed in a vicinity of pupil positions of the image-forming lenses.

In addition, the above-described aspect may be provided with an optical-path-length varying part that can vary an optical-path length between the two image-forming lenses disposed at positions that sandwich any one of the intermediate images.

In addition, in the above-described aspect, the optical-path-length varying part may be provided with a flat mirror that is disposed perpendicularly to an optical axis and that reflects light that forms the intermediate images so as to fold back the light; an actuator that moves the flat mirror in an optical-axis direction; and a beam splitter that splits the light reflected by the flat mirror into light in two directions.

In addition, the above-described aspect may be provided with a variable spatial phase modulator that is disposed in a vicinity of a pupil position of any one of the image-forming lenses, and that changes a position of the final image in the optical-axis direction by changing a spatial phase modulation to be applied to the wavefront of the light.

In addition, in the above-described aspect, a function of at least one of the first phase modulator and the second phase modulator may be performed by the variable spatial phase modulator.

In addition, in the above-described aspect, the first phase modulator and the second phase modulator may apply, to a wavefront of a beam, phase modulations that change in a one-dimensional direction perpendicular to an optical axis.

In addition, in the above-described aspect, the first phase modulator and the second phase modulator may apply, to a wavefront of a beam, phase modulations that change in two-dimensional directions perpendicular to an optical axis.

In addition, in the above-described aspect, the first phase modulator and the second phase modulator may be transmitting-type devices that apply phase modulations to a wavefront of light when allowing the light to pass therethrough.

In addition, in the above-described aspect, the first phase modulator and the second phase modulator may be reflecting-type devices that apply phase modulations to a wavefront of light when reflecting the light.

In addition, in the above-described aspect, the first phase modulator and the second phase modulator may have complementary shapes.

In addition, in the above-described aspect, the first phase modulator and the second phase modulator may apply phase modulations to a wavefront by using a refractive-index distribution of a transparent material.

In addition, another aspect of the present invention is an illumination apparatus including any one of the above-described image-forming optical systems and a light source that is disposed on an object side of the image-forming optical system and that generates illumination light to be made to enter the image-forming optical system.

In addition, another aspect of the present invention is an observation apparatus including any one of the above-described image-forming optical systems and a photo-detector that is disposed on a final-image side of the image-forming optical system and that detects light emitted from an observation subject.

In the above-described aspect, the photo-detector may be disposed at a final-image position in the image-forming optical system and is an image-acquisition device that captures the final image.

In addition, another aspect of the present invention is an observation apparatus including any one of the above-described image-forming optical systems; a light source that is disposed on an object side of the image-forming optical system and that generates illumination light to be made to enter the image-forming optical system; and a photo-detector that is disposed on a final-image side of the image-forming optical system and that detects light emitted from an observation subject.

The above-described aspect may be provided with a Nipkow-disk-type confocal optical system that is disposed between the light source, and the photo-detector and image-forming optical system.

In addition, in the above-described aspect, the light source may be a laser light source, and the photo-detector may be provided with a confocal pinhole and a photoelectric conversion device.

In addition, another aspect of the present invention provides an observation apparatus including the above-described illumination apparatus and a photo-detector that detects light emitted from an observation subject that is illuminated by the illumination apparatus, wherein the light source is a pulsed laser light source.

DESCRIPTION OF EMBODIMENTS

An image-forming optical system 1 according to an embodiment of the present invention will be described below with reference to the drawings.

Figure 1:
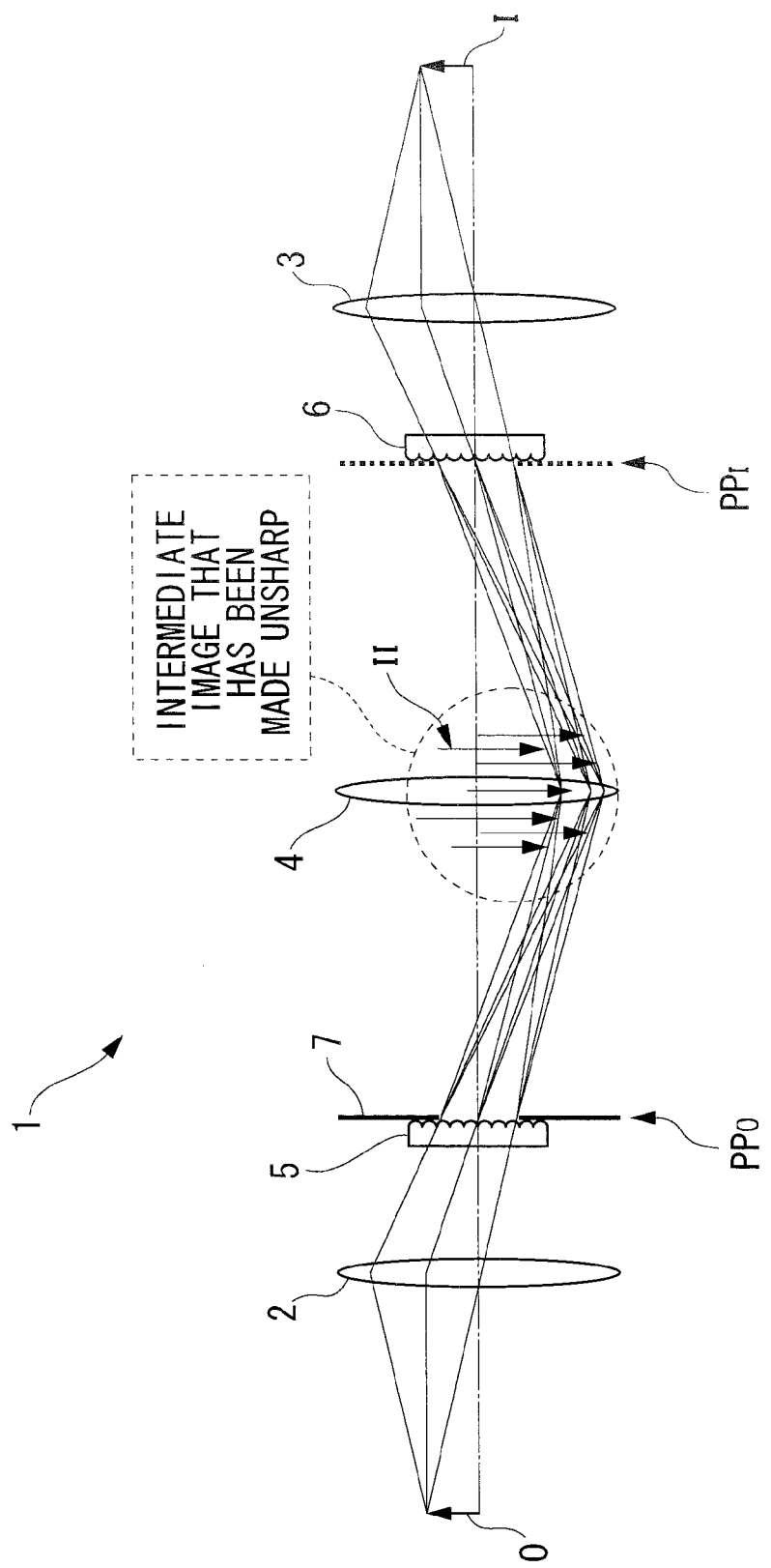
FIG. 1 is a schematic view showing an image-forming optical system according to an embodiment of the present invention.

As shown in FIG. 1, the image-forming optical system 1 according to this embodiment is provided with two image-forming lenses 2 and 3 that are disposed as one set with a space therebetween; a field lens 4 that is disposed at an intermediate-image-forming plane between the image-forming lenses 2 and 3; a wavefront disturbing device (first phase modulator) 5 that is disposed in the vicinity of a pupil position $PP_O$ of the image-forming lens 2 at the object O side; and a wavefront restoring device (second phase modulator) 6 that is disposed in the vicinity of a pupil position $PP_I$ of the image-forming lens 3 at the image I side. Reference sign 7 in the figure indicates an aperture stop.

The wavefront disturbing device 5 is configured so as to disturb the wavefront when light that is emitted from an object O and that is focused by the image-forming lens 2 at the object O side passes therethrough. By disturbing the wavefront by means of the wavefront disturbing device 5, an intermediate image formed at the field lens 4 is made unsharp.

On the other hand, the wavefront restoring device 6 is configured so as to apply a phase modulation to light in such a way that the wavefront disturbance applied by the wavefront disturbing device 5 is cancelled out when light focused by the field lens 4 passes therethrough. The wavefront restoring device 6 possesses opposite phase properties relative to those of the wavefront disturbing device 5, so that a sharp final image I is formed by canceling out the wavefront disturbance.

More general concepts related to the image-forming optical system 1 according to this embodiment will now be described in detail.

Figure 2:
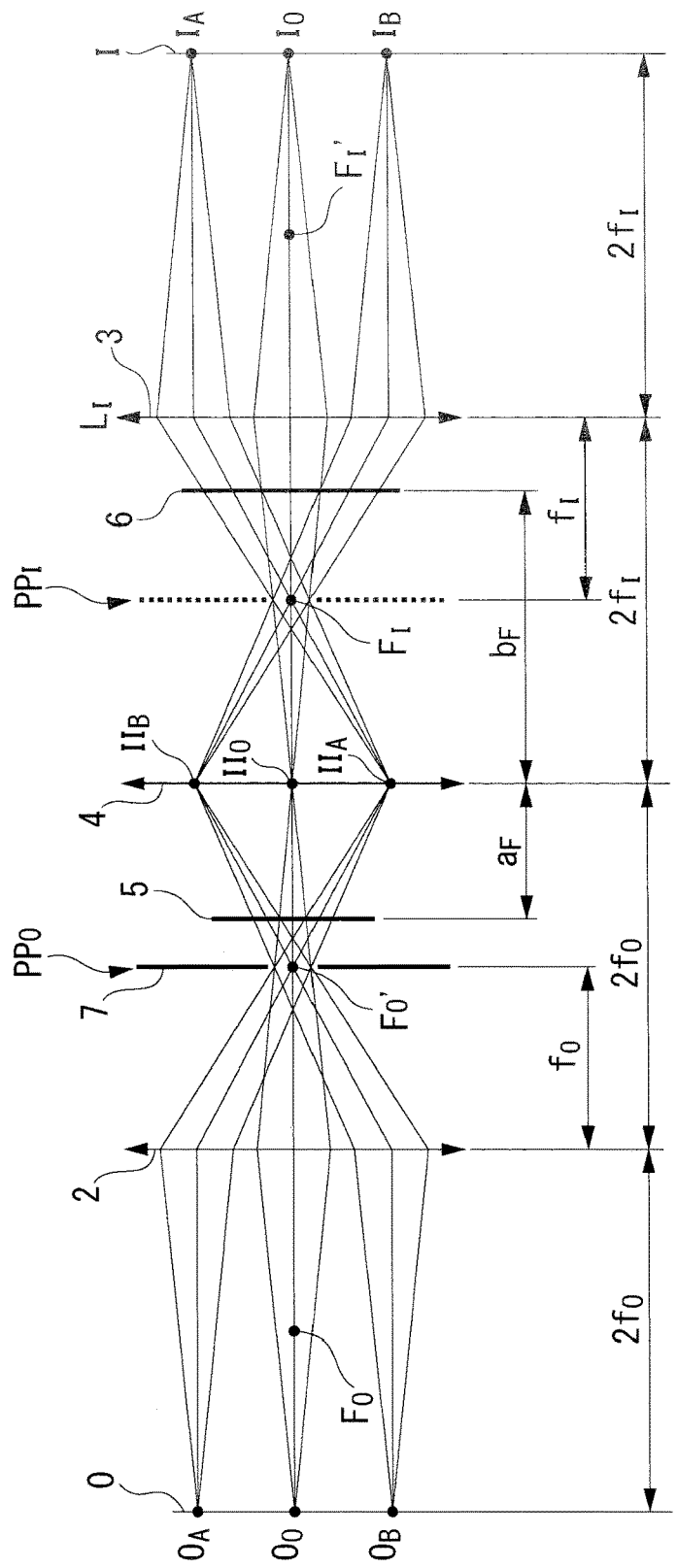
FIG. 2 is a schematic view for explaining the operation of the image-forming optical system in FIG. 1.

In the example shown in FIG. 2, the image-forming optical system 1 is telecentric on the object O side and the image I side. In addition, the wavefront disturbing device 5 is disposed at a position away from the field lens 4 by a distance $a_F$ toward the object O, and the wavefront restoring device 6 is disposed at a position away from the field lens 4 by a distance $b_F$ toward the image I.

In FIG. 2, reference sign $f_o$ indicates the focal length of the image-forming lens 2, reference sign $f_I$ indicates the focal length of the image-forming lens 3, reference signs $F_O$ and $F_O'$ indicate focal positions of the image-forming lens 2, reference signs $F_I$ and $F_I'$ indicate the focal positions of the image-forming lens 3, and reference signs $II_O$, $II_A$, and $II_B$ indicate intermediate images.

Here, the wavefront disturbing device 5 need not necessarily be disposed in the vicinity of the pupil position $PP_O$ of the image-forming lens 2, and, also, the wavefront restoring device 6 need not necessarily be disposed in the vicinity of the pupil position $PP_I$ of the image-forming lens 3.

However, with regard to image formation by the field lens 4, the wavefront disturbing device 5 and the wavefront restoring device 6 must be disposed so as to have a mutually conjugate positional relationship, as indicated by Expression (1).

$$1/f_F = 1/a_F + 1/b_F \quad (1)$$

where $f_F$ is the focal length of the field lens 4.

Figure 3:
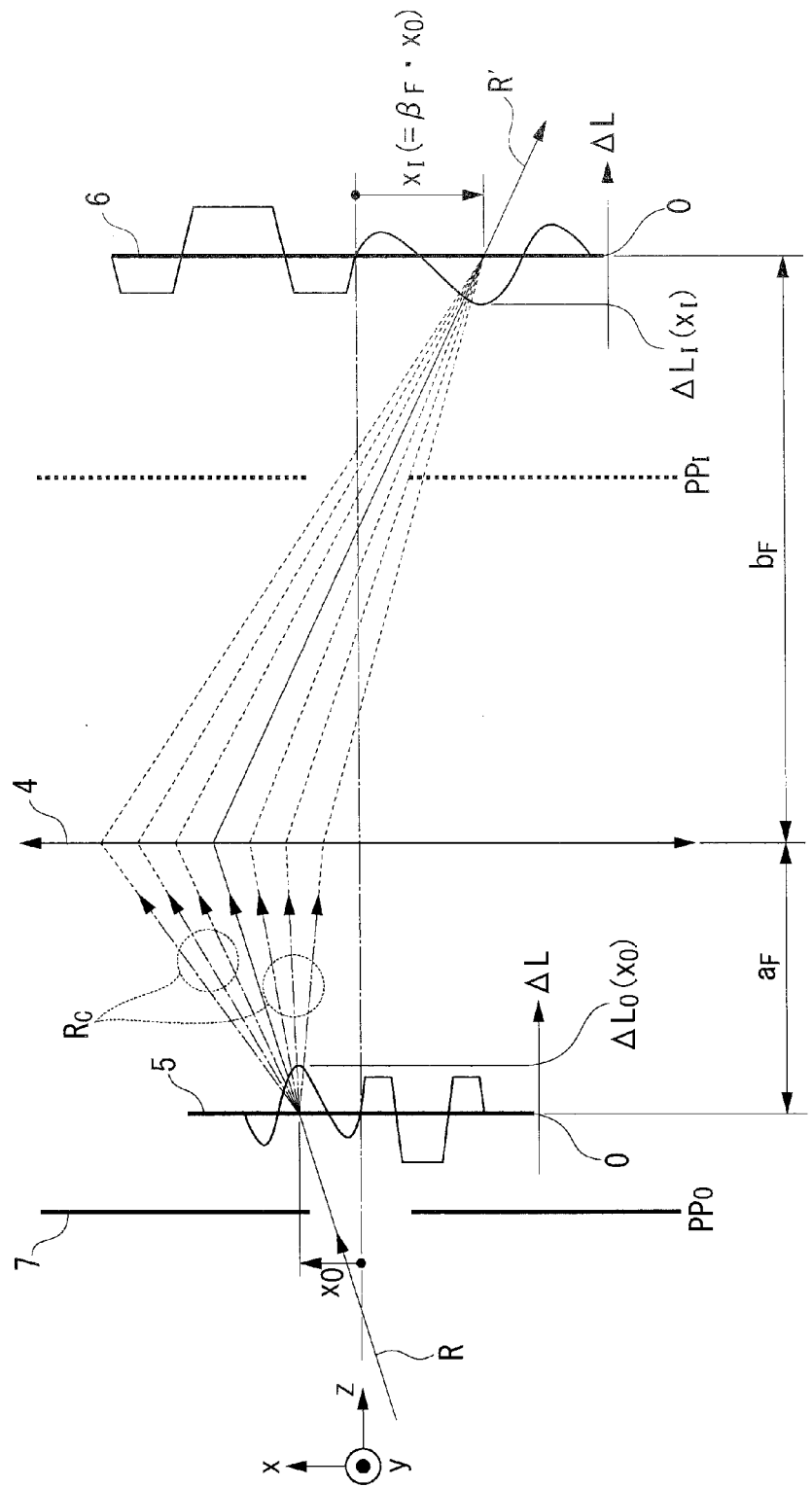
FIG. 3 is an enlarged view showing portions between an object-side pupil position and a wavefront restoring device in FIG. 2.

FIG. 3 is a diagram showing, in detail, the portion between the pupil position $PP_O$ on the object O side and the wavefront restoring device 6 in FIG. 2.

Here, $\Delta L$ is a phase advance achieved, with reference to a ray that passes through a specific position (that is, a ray height), when light passes through an optical element.

In addition, $\Delta L_O(x_O)$ is a function that gives, with reference to the case in which light travels along an optical axis of wavefront disturbing device 5 (that is, $x=0$), a phase advance equal to that in the case in which light travels at an arbitrary ray height $x_O$ in the wavefront disturbing device 5.

Furthermore, $\Delta L_I(x_I)$ is a function that gives, with reference to the case in which light travels along an optical axis of the wavefront restoring device 6 (that is, $x=0$), a phase advance equal to that in the case in which light travels at an arbitrary ray height $x_I$ in the wavefront restoring device 6.

$\Delta L_O(x_O)$ and $\Delta L_I(x_I)$ satisfy Expression (2) below.

$$\Delta L_O(x_O) + \Delta L_I(x_I) = \Delta L_O(x_O) + \Delta L_I(\beta_F \cdot x_O) = 0 \quad (2)$$

Here, $\beta_F$ is a lateral magnification of the field lens 4 when the wavefront disturbing device 5 and the wavefront restoring device 6 are in a conjugate relationship, which is expressed in Expression (3) below.

$$\beta_F = -b_F/a_F \quad (3)$$

When a single ray R enters such an image-forming optical system 1 and passes through a position $x_O$ in the wavefront disturbing device 5, at that point, the ray is subjected to a phase modulation based on the function $\Delta L_O(x_O)$, and a disturbed ray Rc is generated due to refraction, diffraction, scattering, or the like. The disturbed ray Rc is projected by the field lens 4 to a position $x_I = \beta_F \cdot x_O$ on the wavefront restoring device 6, together with components of the ray R that were not subjected to the phase modulation. By passing therethrough, the projected ray is subjected to a phase modulation based on the function $\Delta L_I(\beta_F \cdot x_O) = -\Delta L_O(x_O)$, and thus, the phase modulation applied thereto by the wavefront disturbing device 5 is cancelled out. By doing so, the ray is restored to a single ray R' whose wavefront is not disturbed.

In the case in which the wavefront disturbing device 5 and the wavefront restoring device 6 are in a conjugate positional relationship and also possess the properties according to Expression (2), the ray that has been subjected to phase modulation by passing through a position in the wavefront disturbing device 5 passes through, without exception, a specific position in the wavefront restoring device 6, which is in one-to-one correspondence with the above-described position and at which the phase modulation that cancels out the phase modulation applied by the wavefront disturbing device 5 is applied. With the optical system shown in FIGS. 2 and 3, the above-described effects are exerted on the ray R regardless of the incident position $x_O$ and the incident angle thereof in the wavefront disturbing device 5. Specifically, for all types of rays R, it is possible to make the intermediate image II unsharp and also to form a sharp final image I.

Figure 4:
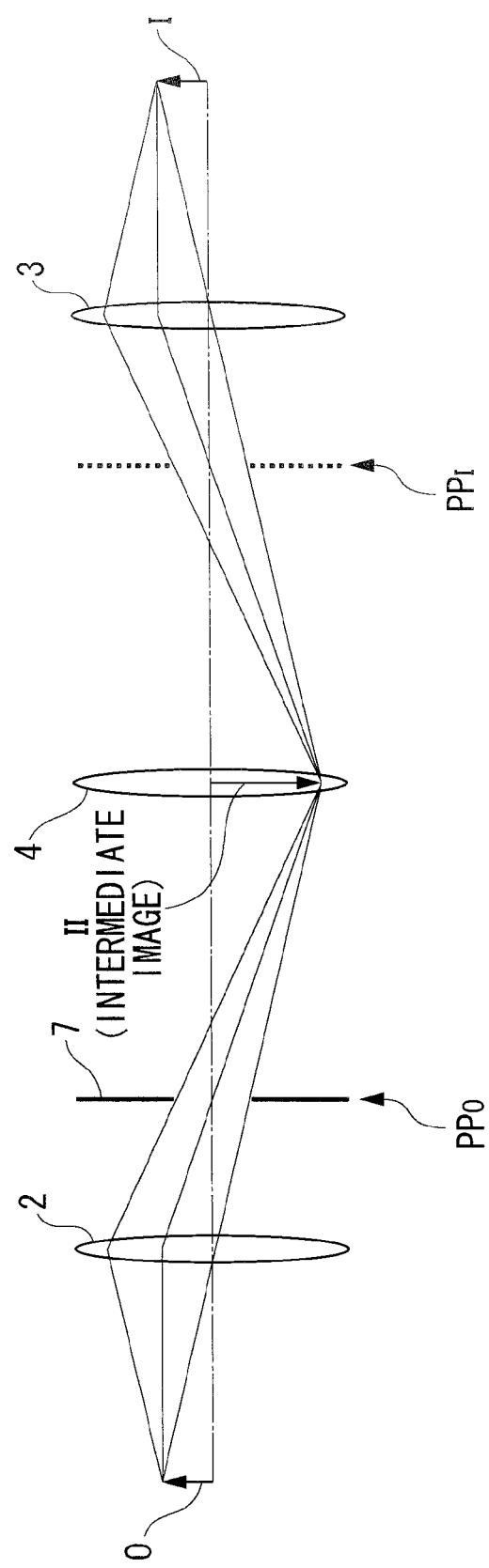
FIG. 4 is a schematic view showing a conventional image-forming optical system.

FIG. 4 shows a conventional image-forming optical system. With this image-forming optical system, light focused by the image-forming lens 2 at the object O side forms a sharp intermediate image II at the field lens 4 disposed at the intermediate-image-forming plane, and is subsequently focused by the image-forming lens 3 at the image I side, thus forming a sharp final image I.

With the conventional image-forming optical system, in the case in which there are blemishes, dust, or the like on a surface of the field lens 4 or there are defects, such as cavities or the like, inside the field lens 4, images of these foreign objects are superimposed on the sharp intermediate image formed at the field lens 4, which results in a problem in that the images of these foreign objects are also included when the final image I is formed.

In contrast, with the image-forming optical system 1 according to this embodiment, because an intermediate image II that has been made unsharp by the wavefront disturbing device 5 is formed at the intermediate-image-forming plane that is disposed at a position coinciding with the field lens 4, when the unsharp intermediate image II is made sharp by being subjected to the phase modulation by the wavefront restoring device 6, the images of foreign objects superimposed on the intermediate image II are made unsharp by being subjected to the same phase modulation. Therefore, it is possible to prevent the images of the foreign objects at the intermediate-image-forming plane from being superimposed on the sharp final image I.

Note that, in the above description, although the two image-forming lenses 2 and 3 have been described as being telecentrically disposed with respect to each other, their arrangement is not limited thereto, and similar effects are also achieved with a non-telecentric system.

In addition, although the function of the phase advance has been assumed to be a one-dimensional function, similar effects may also be achieved by employing a two-dimensional function instead.

In addition, spaces between the image-forming lens 2, the wavefront disturbing device 5, and the field lens 4 and spaces between the field lens 4, the wavefront restoring device 6, and the image-forming lens 3 need not necessarily be provided, and these devices may be optically coupled.

In addition, the individual lenses that form the image-forming optical system 1, namely, the image-forming lenses 2 and 3 and the field lens 4, are configured such that the image forming function and the pupil relay function are clearly divided therebetween; however, in an actual image-forming optical system, a configuration in which a single lens concurrently performs both the image forming function and the pupil relay function may also be employed. In such a case also, if the above-described conditions are satisfied, the wavefront disturbing device 5 can disturb the wavefront to make the intermediate image II unsharp, and the wavefront restoring device 6 can make the final image I sharp by canceling out the wavefront disturbance.

Next, an observation apparatus 10 according to a first embodiment of the present invention will be described below with reference to the drawings.

Figure 5:
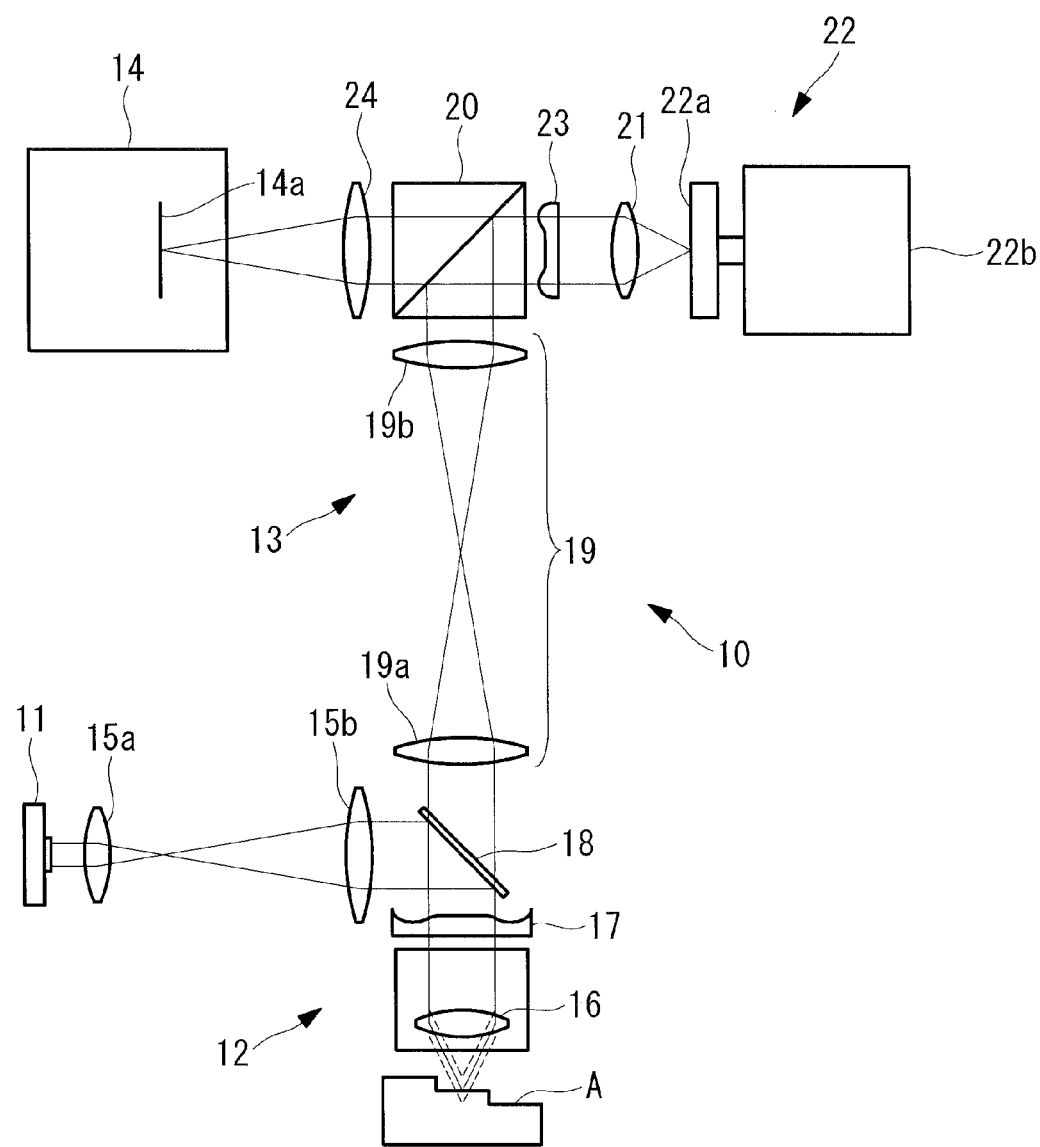
FIG. 5 is a schematic view showing an observation apparatus according to a first embodiment of the present invention.

As shown in FIG. 5, the observation apparatus 10 according to this embodiment is provided with a light source 11 that generates non-coherent illumination light; an illumination optical system 12 that irradiates an observation subject A with the illumination light coming from the light source 11; an image-forming optical system 13 that focuses light coming from the observation subject A; and an image-acquisition device (photo-detector) 14 that captures the light focused by the image-forming optical system 13 and acquires an image thereof.

The illumination optical system 12 is provided with focusing lenses 15a and 15b that focus the illumination light coming from the light source 11 and an objective lens 16 that irradiates the observation subject A with the illumination light focused by the focusing lenses 15a and 15b.

In addition, this illumination optical system 12 is a so-called Koehler illumination optical system, and the focusing lenses 15a and 15b are disposed so that a light emission surface of the light source 11 and a pupil plane of the objective lens 16 are conjugate with each other.

The image-forming optical system 13 is provided with the above-described objective lens (image-forming lens) 16 that is disposed on the object side and that collects observation light (for example, reflected light) emitted from the observation subject A; a wavefront disturbing device 17 that disturbs the wavefront of the observation light collected by the objective lens 16; a first beam splitter 18 that splits off the light whose wavefront has been disturbed from the illumination optical path from the light source 11; a first intermediate-image-forming-lens pair 19 that are disposed so as to have a space therebetween in the optical-axis direction; a second beam splitter 20 that deflects, by 90°, the light that has passed through individual lenses 19a and 19b of the first intermediate-image-forming-lens pair 19; a second intermediate-image-forming lens 21 that forms an intermediate image by focusing the light that has been deflected by the second beam splitter 20; an optical-path-length varying means 22 that is disposed at an intermediate-image-forming plane of the second intermediate-image-forming lens 21; a wavefront restoring device 23 that is disposed between the second beam splitter 20 and the second intermediate-image-forming lens 21; and an image-forming lens 24 that forms a final image by focusing the light that has passed through the wavefront restoring device 23 and the second beam splitter 20.

The image-acquisition device 14 is, for example, a two-dimensional image sensor, such as a CCD or a CMOS, is provided with an image-acquisition surface 14a disposed at a position at which a final image is formed by the image-forming lens 24, and is configured so that a two-dimensional image of the observation subject A can be acquired by capturing the incident light.

The wavefront disturbing device 17 is disposed in the vicinity of the pupil position of the objective lens 16. The wavefront disturbing device 17 is formed of an optically transparent material that allows light to pass therethrough, and is configured so that, when light passes therethrough, a phase modulation is applied to the wavefront of the light in accordance with depressions and protrusions on the surface of the optically transparent material. In this embodiment, the required wavefront disturbance is achieved by making the observation light coming from the observation subject A pass through the wavefront disturbing device 17 once.

In addition, the wavefront restoring device 23 is disposed in the vicinity of the pupil position of the second intermediate-image-forming lens 21. The wavefront restoring device 23 is also formed of an optically transparent material that allows light to pass therethrough, and is configured so as that, when light passes therethrough, a phase modulation is applied to the wavefront of the light in accordance with depressions and protrusions on the surface of the optically transparent material. In this embodiment, by making the observation light deflected by the beam splitter 20 and the observation light reflected by the optical-path-length varying means 22 so as to be folded back pass therethrough twice while the light travels in a reciprocating manner, the wavefront restoring device 23 is configured so as to apply, to the wavefront of the light, the phase modulation that cancels out the wavefront disturbance applied by the wavefront disturbing device 17.

The optical-path-length varying means 22 is provided with a flat mirror 22a that is disposed perpendicularly to the optical axis and an actuator 22b that displaces the flat mirror 22a in the optical-axis direction. When the flat mirror 22a is displaced in the optical-axis direction by actuating the actuator 22b of the optical-path-length varying means 22, the optical-path length between the second intermediate-image-forming lens 21 and the flat mirror 22a is changed, and, by doing so, the position in the observation subject A that is conjugate with the image-acquisition surface 14a, that is, the front focal-point position of the objective lens 16, is changed in the optical-axis direction.

In order to observe the observation subject A by using the thus-configured observation apparatus 10 according to this embodiment, the illumination light coming from the light source 11 is radiated onto the observation subject A by means of the illumination optical system 12. The observation light emitted from the observation subject A is collected by the objective lens 16, passes through the first beam splitter 18 and the intermediate-image-forming optical system 19 by passing through the wavefront disturbing device 17 once, passes through the wavefront restoring device 23 by being deflected by 90° by the second beam splitter 20, passes through the wavefront restoring device 23 again by being reflected, so as to be folded back, by the flat mirror 22a of the optical-path-length varying means 22, and passes through the beam splitter 20, thus capturing a final image formed by the image-forming lens 24 by means of the image-acquisition device 14.

By moving the flat mirror 22a in the optical-axis direction by actuating the actuator 22b of the optical-path-length varying means 22, the optical-path length between the second intermediate-image-forming lens 21 and the flat mirror 22a can be changed, and, by doing so, the front focal-point position of the objective lens 16 can be moved in the optical-axis direction. Thus, by capturing the observation light at different focal-point positions, it is possible to acquire a plurality of images that are focused at different positions of the observation subject A in the depth direction. Furthermore, by applying high-frequency emphasizing processing after combining these images by taking an arithmetic average thereof, it is possible to acquire an image having a large depth of field.

In this case, although the intermediate image is formed by the second intermediate-image-forming lens 21 in the vicinity of the flat mirror 22a of the optical-path-length varying means 22, this intermediate image has been made unsharp due to wavefront disturbance that remains when the wavefront disturbance applied by passing through the wavefront disturbing device 17 is partially cancelled out by passing through the wavefront restoring device 23 once. Then, the light that has formed the unsharp intermediate image is focused by the second intermediate-image-forming lens 21 and is, subsequently, made to pass through the wavefront restoring device 23 again, which completely cancels out the wavefront disturbance thereof.

As a result, with the observation apparatus 10 according to this embodiment, there is an advantage in that, even if foreign objects such as blemishes, dust or the like exist on the surface of the flat mirror 22a, it is possible to prevent images of the foreign objects from being captured in a final image by being superimposed thereon, and that it is also possible to acquire a sharp image of the observation subject A.

Similarly, although the intermediate image formed by the first intermediate-image-forming-lens pair 19 also undergoes large changes in the optical-axis direction when the focal-point positions on the observation subject A are moved in the optical-axis direction, as a result of these changes, even if the intermediate image coincides with the position of the first intermediate-image-forming-lens pair 19, or even in the case in which another optical element additionally exits in the area in which the changes occur, because the intermediate image has been made unsharp, it is possible to prevent the images of the foreign objects from being captured in the final image by being superimposed thereon.

Next, an observation apparatus 30 according to a second embodiment of the present invention will be described below with reference to the drawings.

In describing this embodiment, the same reference signs are assigned to portions having the same configurations as those of the observation apparatus 10 according to the first embodiment described above, and descriptions thereof will be omitted.

Figure 6:
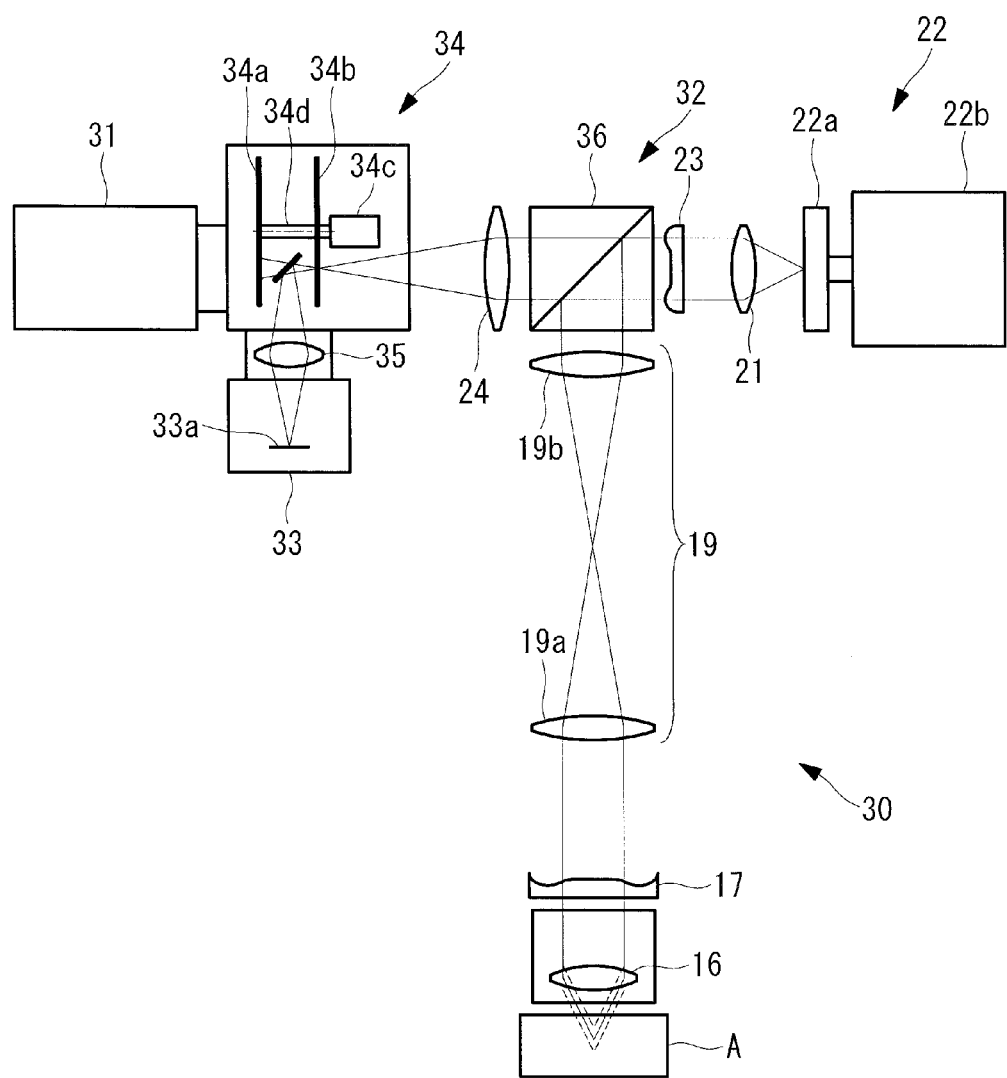
FIG. 6 is a schematic view showing an observation apparatus according to a second embodiment of the present invention.

As shown in FIG. 6, an observation apparatus 30 according to this embodiment is provided with a laser light source 31; an image-forming optical system 32 that focuses laser beams coming from the laser light source 31 on the observation subject A and that also collects light coming from the observation subject A; an image-acquisition device (photodetector) 33 that captures the light collected by the image-forming optical system 32; and a Nipkow-disk-type confocal optical system 34 that is disposed between the light source 31, and the image-acquisition device 33 and image-forming optical system 32.

The Nipkow-disk-type confocal optical system 34 is provided with two disks 34a and 34b that are disposed parallel to each other with a space therebetween and an actuator 34c that rotates the disks 34a and 34b at the same time. Numerous microlenses (not shown) are arrayed on the disk 34a on the laser light source 31 side, and the disk 34b on the object side is provided with numerous pinholes (not shown) at positions that correspond to the individual microlenses. In addition, a dichroic mirror 34d that splits light that has passed through the pinholes is secured in the space between the two disks 34a and 34b, and the light split off by the dichroic mirror 34d is focused by the focusing lens 35, a final image is formed on an image-acquisition surface 33a of the image-acquisition device 33, and thus, an image is acquired.

In the image-forming optical system 32, the first beam splitter 18 and the second beam splitter 20 in the first embodiment are unified into a single beam splitter 36, and thus, the optical path for irradiating the observation subject A with the light that has passed through the pinholes of the Nipkow-disk-type confocal optical system 34 and the optical path through which the light generated at the observation subject A enters the pinholes of the Nipkow-disk-type confocal optical system 34 are exactly the same.

The operation of the thus-configured observation apparatus 30 according to this embodiment will be described below.

With the observation apparatus 30 according to this embodiment, the light that enters the image-forming optical system 32 from the pinholes of the Nipkow-disk-type confocal optical system 34 is focused by the second intermediate-image-forming lens 21 after passing through the beam splitter 36 and the phase modulator 23, and is reflected by the flat mirror 22a of the optical-path-length varying means 22 so as to be folded back. Then, after passing through the second intermediate-image-forming lens 21, the light passes through the phase modulator 23 again, is deflected by 90° by the beam splitter 36, passes through the first intermediate-image-forming-lens pair 19 and the phase modulator 17, and is focused on the observation subject A by the objective lens 16.

In this embodiment, the phase modulator 23 through which the laser beam passes twice first serves as a wavefront disturbing device that disturbs the wavefront of the laser beam, and the phase modulator 17 through which the laser beam subsequently passes once serves as a wavefront restoring device that applies the phase modulation that cancels out the wavefront disturbance applied by the phase modulator 23.

Therefore, although an image of the light sources that are formed like numerous point sources of light by the Nipkow-disk-type confocal optical system 34 is formed as an intermediate image on the flat mirror 22a by the second intermediate-image-forming lens 21, because the intermediate image formed by the second intermediate-image-forming lens 21 is made unsharp by passing through the phase modulator 23 once, it is possible to prevent a problem by the images of the foreign objects existing in the intermediate-image-forming plane are superimposed on the final image.

In addition, because the disturbance applied to the wavefront by passing through the phase modulator 23 twice is canceled out by passing through the phase modulator 17 once, it is possible to form a sharp image of the numerous point sources of light at the observation subject A. Then, high-speed scanning can be performed by moving the image of the numerous point sources of light formed at the observation subject A in a direction that intersects the optical axis by rotating the disks 34a and 34b by actuating the actuator 34c of the Nipkow-disk-type confocal optical system 34.

On the other hand, light, for example, fluorescence, generated at the position in the observation subject A at which the image of the point sources of light is formed is collected by the objective lens 16, is deflected by 90° by the beam splitter 36 after passing through the phase modulator 17 and the first intermediate-image-forming-lens pair 19, passes through the phase modulator 23, is focused by the second intermediate-image-forming lens 21, and is reflected by the flat mirror 22a so as to be folded back. Subsequently, the light is focused by the second intermediate-image-forming lens 21 again, passes through the phase modulator 23 and the beam splitter 36, is focused by the image-forming lens 24, and forms an image at the pinhole position of the Nipkow-disk-type confocal optical system 34.

The light that has passed through the pinholes is split off from the optical path from the laser light source by the dichroic mirror, is focused by the focusing lens, and forms the final image at the image-acquisition surface of the image-acquisition device.

In this case, the phase modulator 17 through which the fluorescence generated at the observation subject in the form of numerous points passes serves as a wavefront disturbing device as in the first embodiment, and the phase modulator 23 serves as a wavefront restoring device.

Therefore, by passing through phase modulator 23 once, although the fluorescence whose wavefront has been disturbed by passing through the phase modulator 17 would be in a state in which the disturbance is partially cancelled out, the intermediate image formed on the flat mirror 22a would be an unsharp image. Then, the fluorescence whose wavefront disturbance has completely been cancelled out by passing through the phase modulator 23 once more forms an image at the pinholes of the Nipkow-disk-type confocal optical system 34, is split by the dichroic mirror 34d after passing through the pinholes, is focused by the focusing lens 35, and forms a sharp final image on the image-acquisition surface 33a of the image-acquisition device 33.

By doing so, with the observation apparatus according to this embodiment, there is an advantage in that, as an illumination apparatus that radiates laser beams onto the observation subject A and also as an observation apparatus with which fluorescence generated at the observation subject A is captured, it is possible to acquire a sharp final image while preventing images of foreign objects at an intermediate-image-forming plane from being superimposed on the final image by making the intermediate image unsharp.

Next, an observation apparatus 40 according to a third embodiment of the present invention will be described below with reference to the drawings.

In describing this embodiment, the same reference signs are assigned to portions having the same configurations as those of the observation apparatus 30 according to the second embodiment described above, and descriptions thereof will be omitted.

Figure 7:
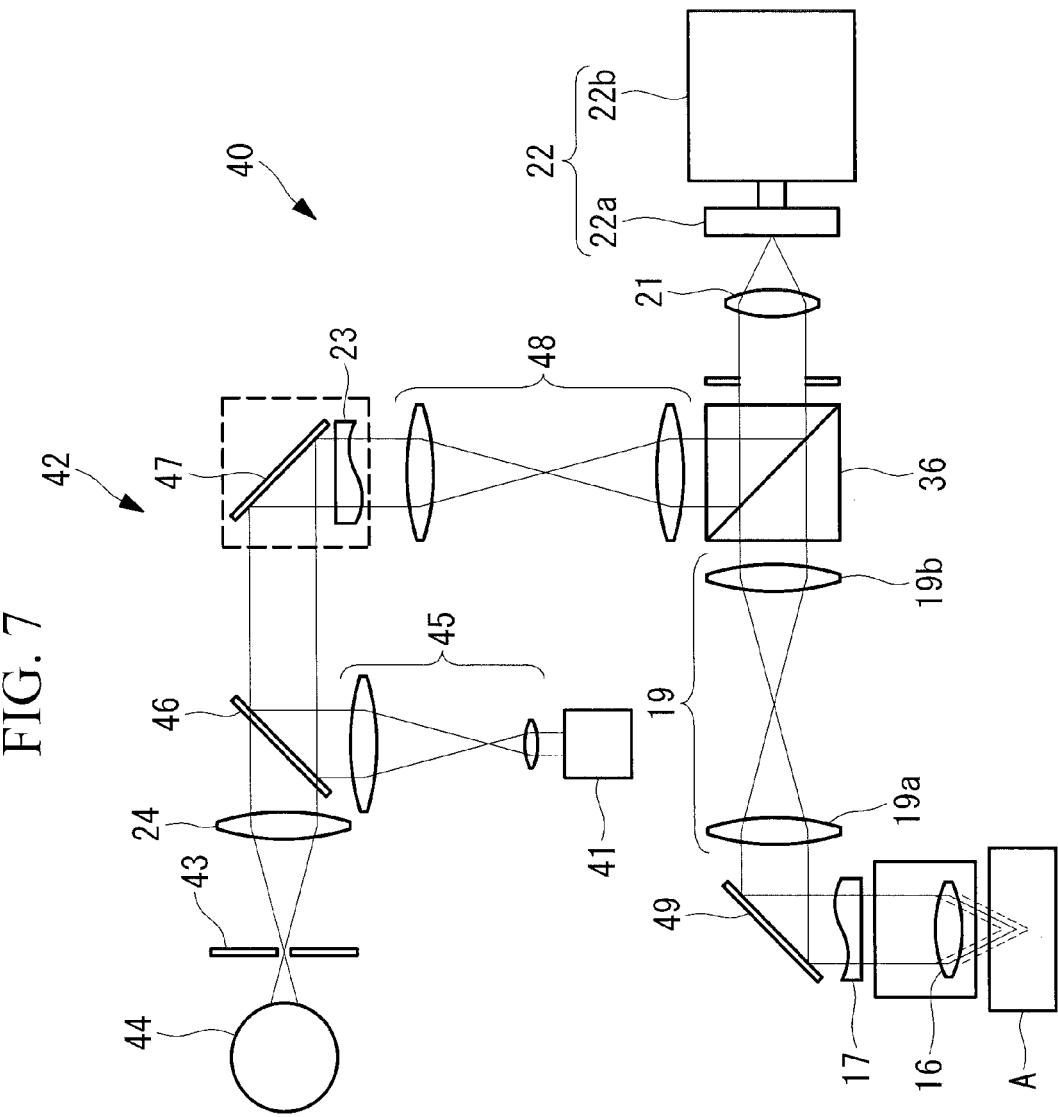
FIG. 7 is a schematic view showing an observation apparatus according to a third embodiment of the present invention.

As shown in FIG. 7, the observation apparatus 40 according to this embodiment is a laser-scanning confocal observation apparatus.

This observation apparatus 40 is provided with a laser light source 41; an image-forming optical system 42 that focuses laser beams coming from the laser light source 41 on the observation subject A and that also collects light coming from the observation subject A; a confocal pinhole 43 that allows fluorescence collected by the image-forming optical system 42 to pass therethrough; and a photo-detector 44 that detects the fluorescence that has passed through the confocal pinhole 43.

As components differing from those of the observation apparatus 30 according to the second embodiment, the image-forming optical system 42 is provided with a beam expander 45 that expands the beam diameter of a laser beam, a dichroic mirror 46 that deflects the laser beam and that allows fluorescence to pass therethrough, a galvanometer mirror 47 that is disposed in the vicinity of a position that is conjugate with the pupil of the objective lens 16, and a third intermediate-image-forming-lens pair 48. In addition, the phase modulator 23 that disturbs the wavefront of the laser beam is disposed in the vicinity of the galvanometer mirror 47. In the figures, reference sign 49 indicates a mirror.

The operation of the thus-configured observation apparatus 40 according to this embodiment will be described below.

With the observation apparatus 40 according to this embodiment, the laser beam emitted from the laser light source 41, whose diameter is expanded by the beam expander 45, is deflected by the dichroic mirror 46, and is two-dimensionally scanned by the galvanometer mirror 47, after which the laser beam passes through the phase modulator 23 and the third intermediate-image-forming-lens pair 48, and enters the beam splitter 36. The processes after entering the beam splitter 36 are the same as those of the observation apparatus 30 according to the second embodiment.

Specifically, because the laser beam forms an intermediate image at the flat mirror 22a of the optical-path-length varying means 22 after the wavefront thereof is disturbed by the phase modulator 23, the intermediate image is made unsharp, and thus, it is possible to prevent the images of foreign objects that exist in the intermediate-image-forming plane from being superimposed thereon. In addition, because the wavefront disturbance is cancelled out by the phase modulator 17 disposed at the pupil position of the objective lens 16, it is possible to form a sharp final image at the observation subject A. In addition, the image formation depth of the final image can be arbitrarily adjusted by the optical-path-length varying means 22.

On the other hand, fluorescence generated at a position in the observation subject A at which the laser beam forms the final image is collected by the objective lens 16, travels along the optical path in the reverse route from that traveled by the laser beam after passing through the phase modulator 17, is deflected by the beam splitter 36, passes through the third intermediate-image-forming-lens pair 48, the phase modulator 23, the galvanometer mirror 47, and the dichroic mirror 46, and is focused at a confocal pinhole 43 by the image-forming lens 24; and thus, only the fluorescence that has passed through the confocal pinhole 43 is detected by the photo-detector 44.

In this case also, because the fluorescence collected by the objective lens 16 forms an intermediate image after the wavefront thereof is disturbed by the phase modulator 17, the intermediate image is made unsharp, and thus, it is possible to prevent the images of foreign objects that exist in the intermediate-image-forming plane from being superimposed thereon. Also, because the wavefront disturbance is cancelled out by passing through the phase modulator 23, it is possible to form a sharp image at the confocal pinhole 43, and it is possible to efficiently detect the fluorescence generated at the position in the observation subject A at which the laser beam forms the final image. As a result, there is an advantage in that it is possible to acquire a high-resolution, bright confocal image.

Figure 8:
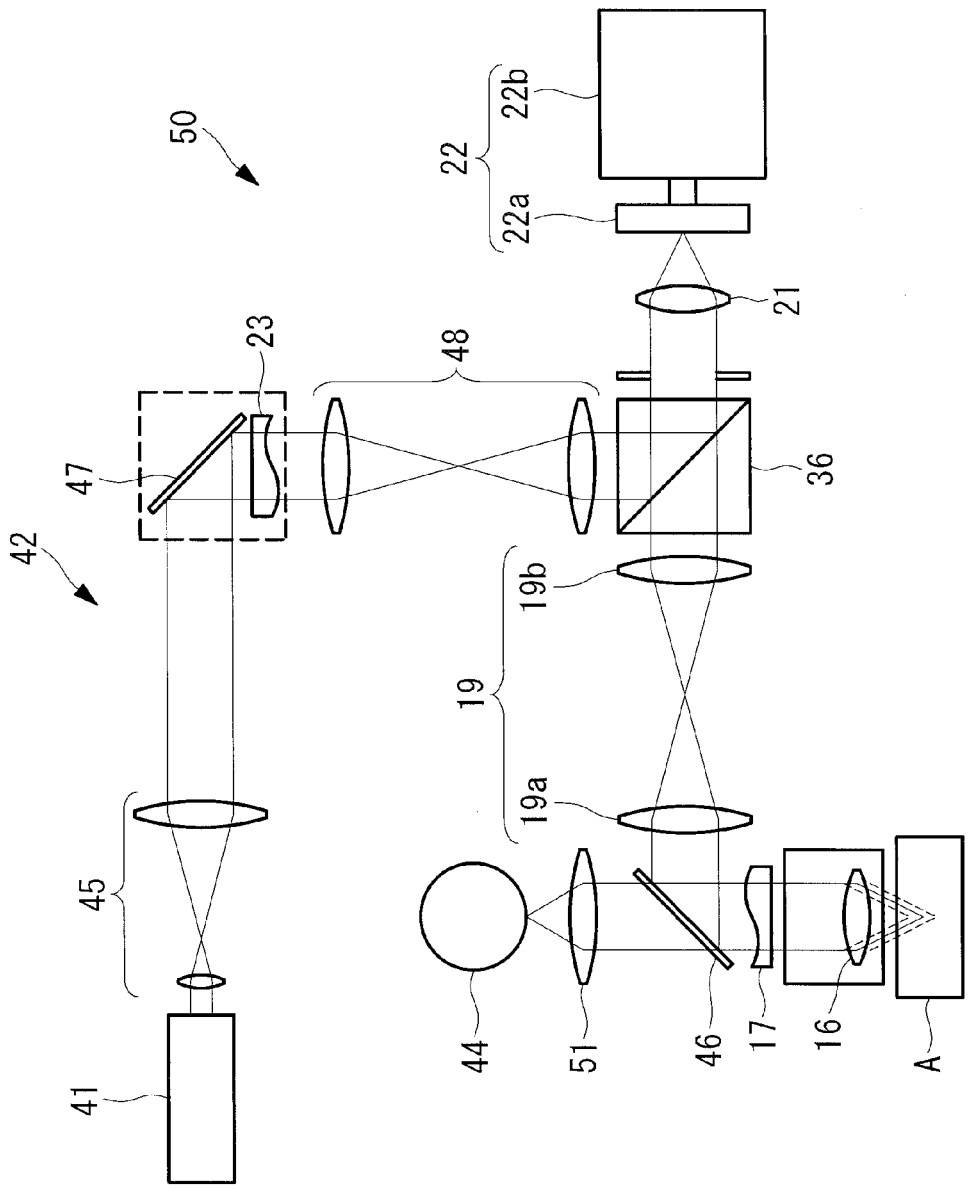
FIG. 8 is a schematic view showing a modification of the observation apparatus in FIG. 7.

Note that, in this embodiment, although a laser-scanning confocal observation apparatus has been described as an example, alternatively, the present invention may be applied to a laser-scanning multi-photon-excitation observation apparatus, as shown in FIG. 8.

In this case, an ultrashort pulsed laser light source may be employed as the laser light source 41, the dichroic mirror 46 may be eliminated from the original position, and the dichroic mirror 46 may be employed instead of the mirror 49.

With an observation apparatus 50 in FIG. 8, it is possible to make the final image sharp by making the intermediate image unsharp by using its function as an illumination apparatus that radiates an ultrashort pulsed laser beam onto the observation subject A. With regard to the fluorescence generated at the observation subject A, the fluorescence is collected by the objective lens 16, passes through the phase modulator 17 and the dichroic mirror 46, is subsequently focused by the focusing lens 51 without forming an intermediate image, and is directly detected by the photo-detector 44.

Figure 9:
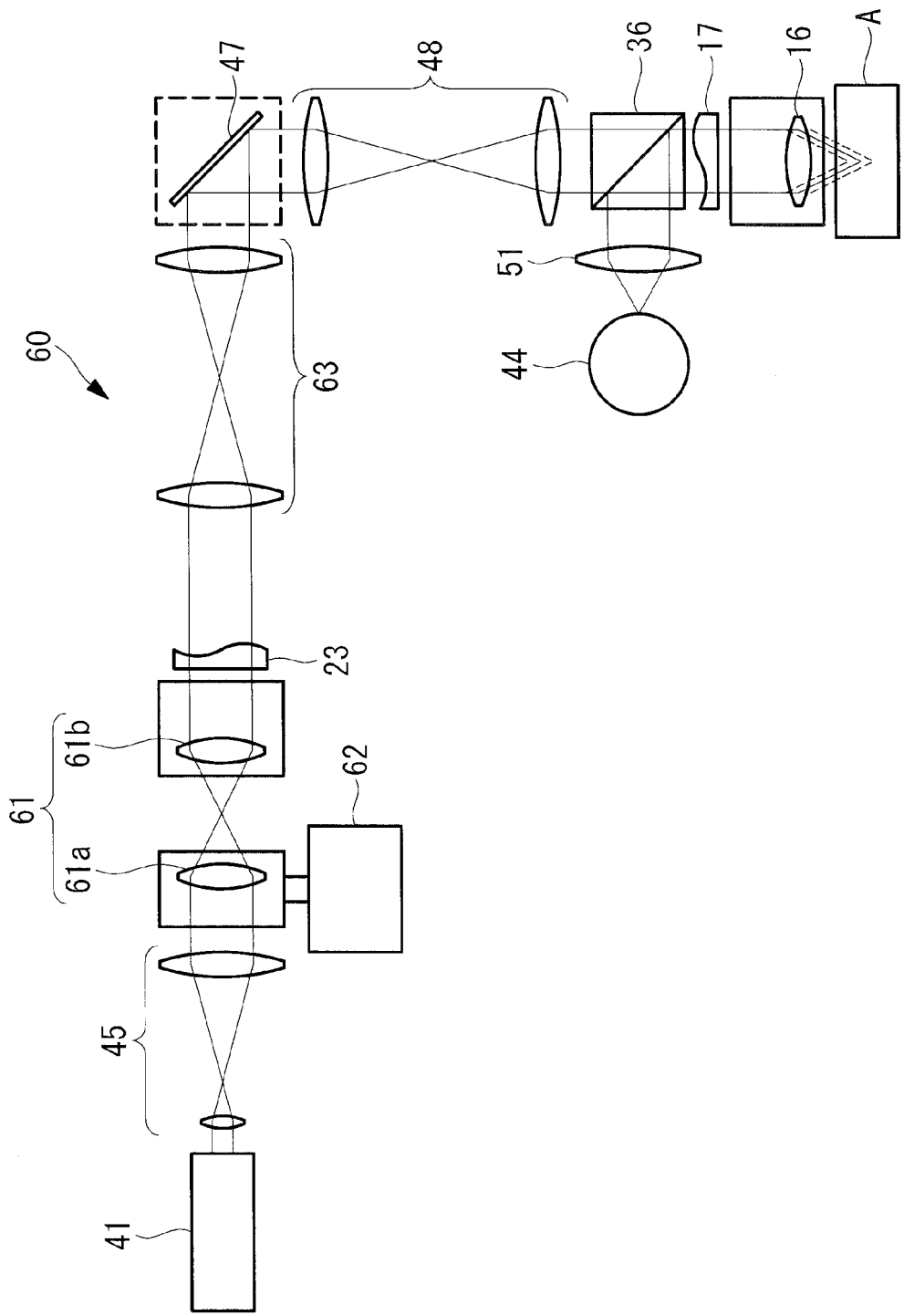
FIG. 9 is a schematic view showing a first modification of the observation apparatus in FIG. 8.

In addition, in the individual embodiments described above, by means of the optical-path-length varying means 22 that changes the optical-path length via the movement of the flat mirror that folds back the optical path, the front focal-point position of the objective lens is changed in the optical-axis direction. Alternatively, an observation apparatus 60 may be configured by employing, as the optical-path-length varying means, a unit that changes the optical-path length by moving a lens 61a, which is one of lenses 61a and 61b that form an intermediate-image-forming optical system 61, in the optical-axis direction by using the actuator 62, as shown in FIG. 9. In the figures, reference sign 63 indicates another intermediate-image-forming optical system.

Figure 30:
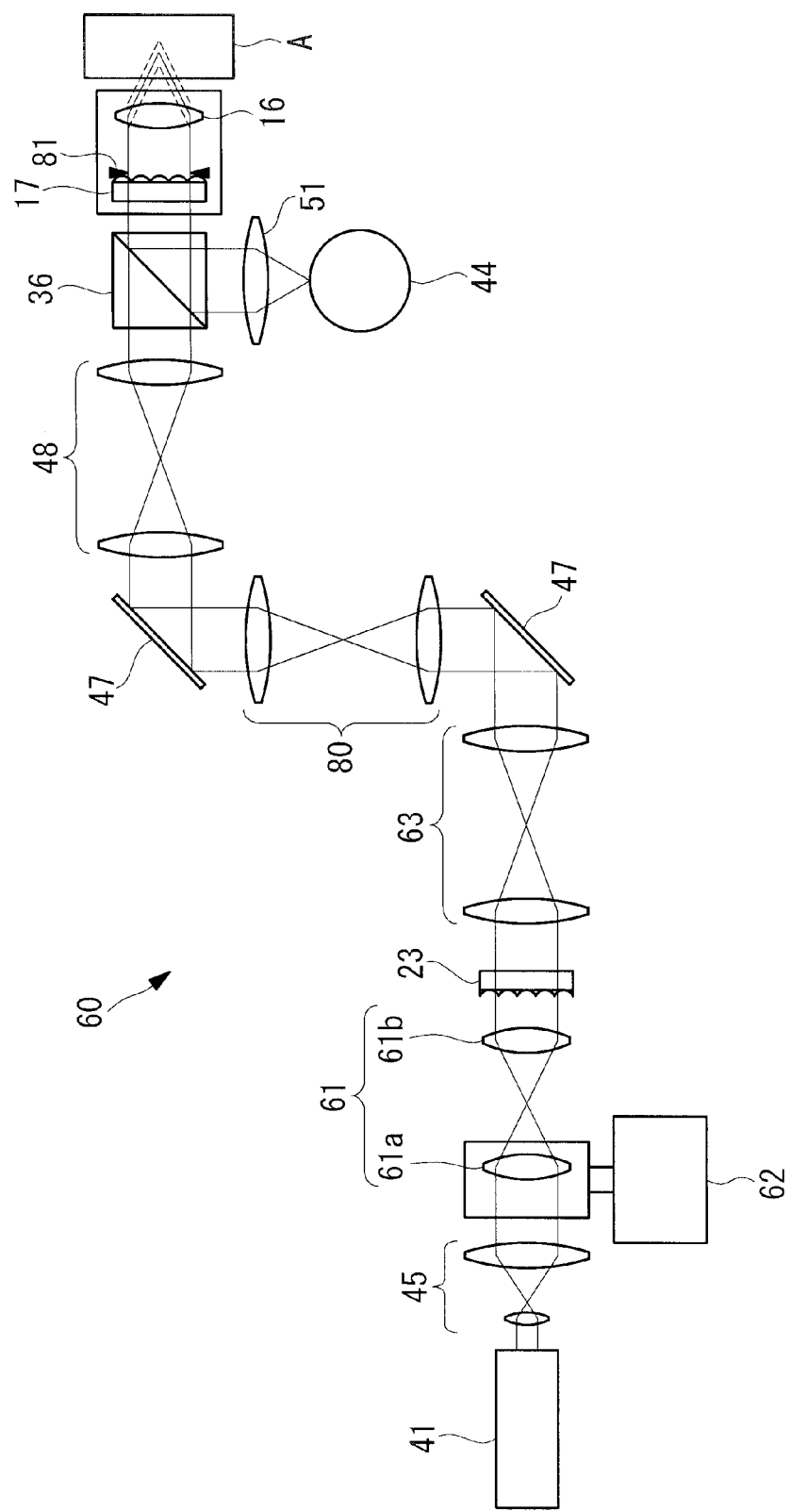
FIG. 30 is a schematic view showing yet another modification of the observation apparatus in FIG. 9.

In addition, as shown in FIG. 30, the present invention may be configured such that another intermediate-image-forming optical system 80 is disposed between two galvanometer mirrors 47 that constitute a two-dimensional light scanner, and the two galvanometer mirrors 47 are precisely disposed in an optically conjugate positional relationship relative to the phase modulators 17 and 23 and an aperture stop 81 disposed at the pupil of the objective lens 16.

Figure 10:
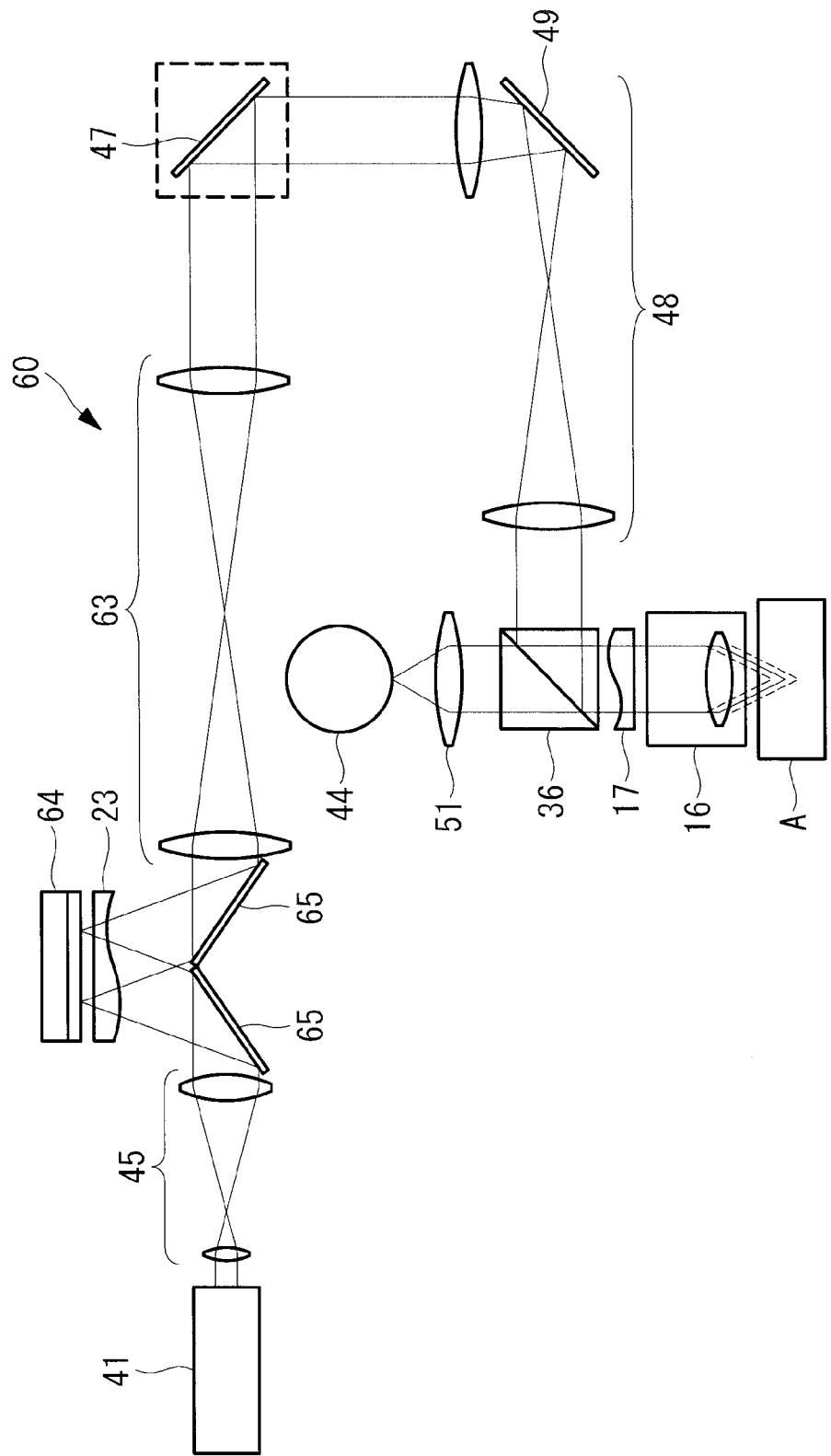
FIG. 10 is a schematic view showing a second modification of the observation apparatus in FIG. 8.

In addition, a spatial light modulator (SLM) 64, such as a reflecting-type LCOS, may be employed as the optical-path-length varying means, as shown in FIG. 10. By doing so, it is possible to change the front focal-point position of the objective lens 16 in the optical-axis direction at high speed by changing the phase modulation to be applied to the wavefront at high speed by controlling liquid crystals of the LCOS. In the figures, reference sign 65 indicates a mirror.

Figure 11:
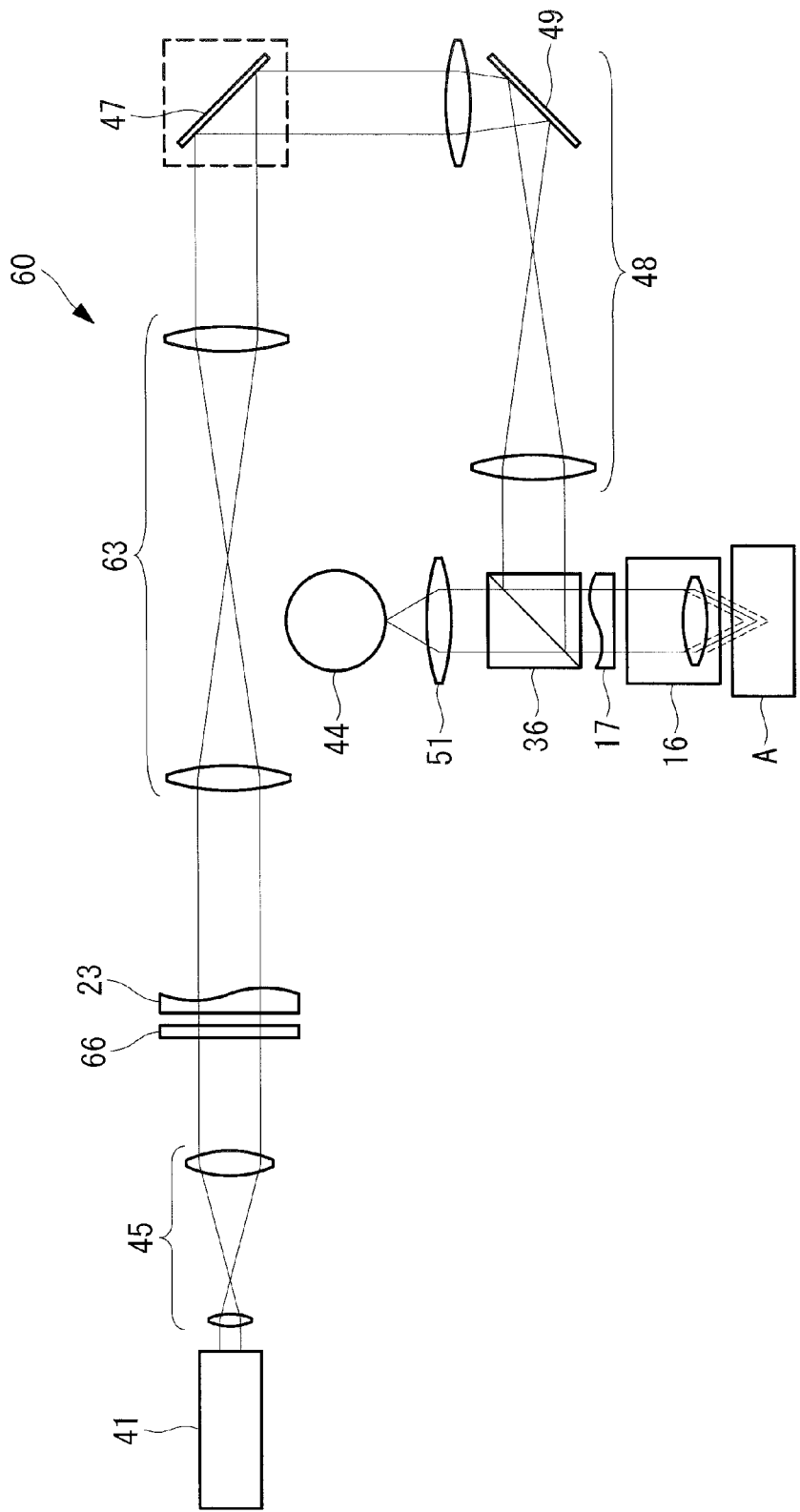
FIG. 11 is a schematic view showing a third modification of the observation apparatus in FIG. 8.

In addition, instead of the spatial light modulator 64 such as a reflecting-type LCOS, a spatial light modulator 66 such as a transmitting-type LCOS may be employed, as shown in FIG. 11. Because the mirror 65 can be eliminated, as compared with the case in which the reflecting-type LCOS is employed, the configuration can be simplified.

As a means of moving the focal-point position in the observation subject A in the optical-axis direction other than the individual examples that have been described (the optical-path-length varying means 22, or the intermediate-image-forming optical system 61 and the actuator 62, or a reflecting-type spatial light modulator 64, or the transmitting-type spatial light modulator 66), it is possible to use various types of variable-power optical elements, which are known as active optical elements, including, first of all, as ones that have mechanically movable portions, a variable-shape mirror (DFM: Deformable Mirror) and a variable-shape lens employing liquid or gel. Also, examples of similar devices that do not have mechanically movable portions include, among others, a liquid-crystal lens and a potassium tantalate niobate (KTN: $KTa_{1-x}Nb_xO_3$) crystal lens that control the refractive index of a medium by means of an electric field, and, additionally, a lens in which a cylindrical-lens effect in an acoustic optical deflector (AOD/Acousto-Optical Deflector) is applied.

As has been described above, in the embodiments of the present invention in the form of microscopes, some means of moving the focal-point position in the observation subject A in the optical-axis direction is included in all cases. Furthermore, with these means of moving the focal-point position in the optical-axis direction, as compared with means employed in a conventional microscope designed for the same purpose (namely, to move either the objective lens or the observation subject in the optical-axis direction), it is possible to considerably increase the operating speed because a low-mass object to be driven is used or a physical phenomenon whose response speed is high is utilized.

This affords an advantage in that it is possible to detect phenomena occurring at higher speed in an observation subject (for example, living biological tissue specimen).

In addition, in the case in which the spatial light modulators 64 and 66, such as a transmitting-type or a reflecting-type LCOS, are employed, it is possible to make the spatial light modulators 64 and 66 perform the function of the phase modulator 23. By doing so, it is possible to omit the phase modulator 23 that serves as a wavefront disturbing device, and thus, there is an advantage in that it is possible to simplify the configuration.

In addition, although the above-described example is a form in which the phase modulator 23 is omitted in a combination of the spatial light modulator and a laser-scanning multi-photon-excitation observation apparatus, in a similar manner, it is also possible to omit the phase modulator 23 in a combination of the spatial light modulator and a laser-scanning confocal observation apparatus. Specifically, in FIGS. 10 and 11, the mirror 49 can be employed instead of the beam splitter 36, the dichroic mirror 46 can be employed between the beam expander 45 and the spatial light modulators 64 and 66, thus forming a branch optical path; and, furthermore, given that the image-forming lens 24, the confocal pinhole 43, and the photo-detector 44 are employed, it is possible to make the spatial light modulators 64 and 66 perform the function of the phase modulator 23. The spatial light modulators 64 and 66 in this case serve as wavefront disturbing devices with respect to a laser beam coming from the laser light source 41, disturbing the wavefront thereof, and, on the other hand, serve as wavefront restoring devices with respect to fluorescence coming from the observation subject A, canceling out the wavefront disturbance applied thereto by the phase modulator 17.

Figure 12:
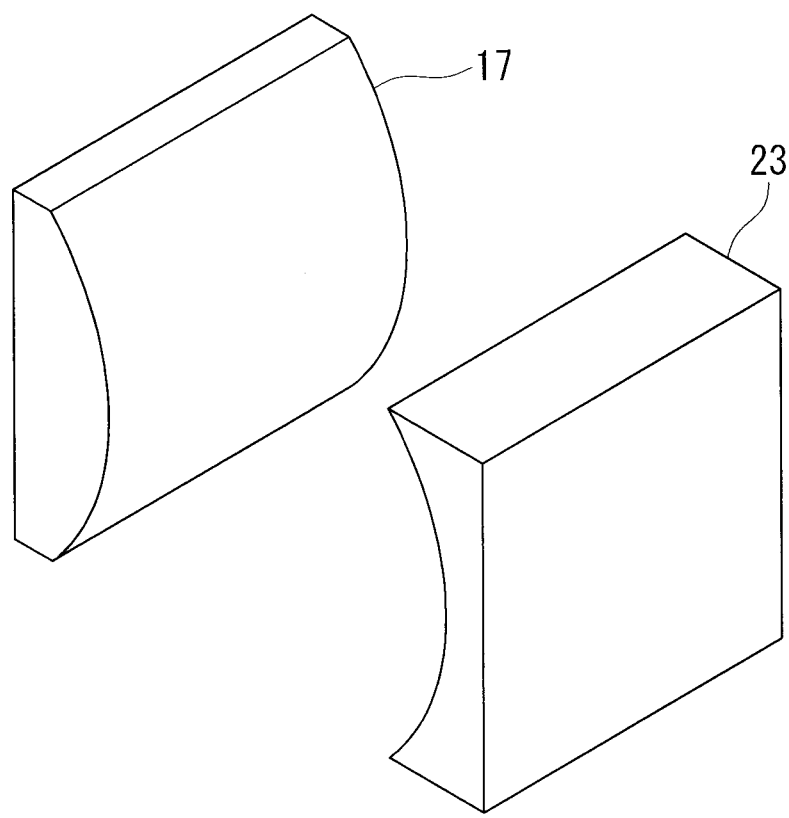
FIG. 12 is a perspective view showing cylindrical lenses as examples of phase modulators used in the image-forming optical system and the observation apparatus of the present invention.

As shown in FIG. 12, cylindrical lenses 17 and 23 may be employed as phase modulators, for example.

In this case, with the cylindrical lens 17, because an intermediate image in the form of a point image is elongated into a linear shape due to astigmatism, it is possible to make the intermediate image unsharp by means of this effect, and it is possible to make the final image sharp by means of the cylindrical lens 23 having a shape that is complementary thereto.

In the case shown in FIG. 12, either a convex lens or a concave lens may be used as a wavefront disturbing device or may be used as a wavefront restoring device.

Figure 13A:
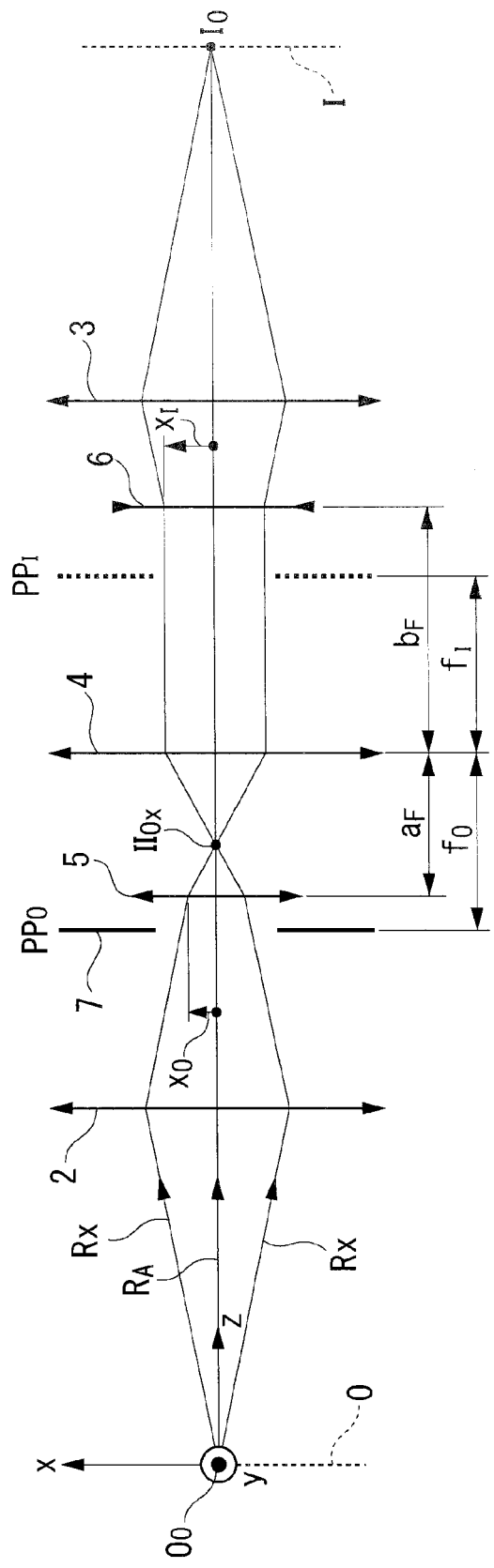
FIG. 13A is a schematic view for explaining the effects of employing the cylindrical lenses in FIG. 12.
Figure 13B:
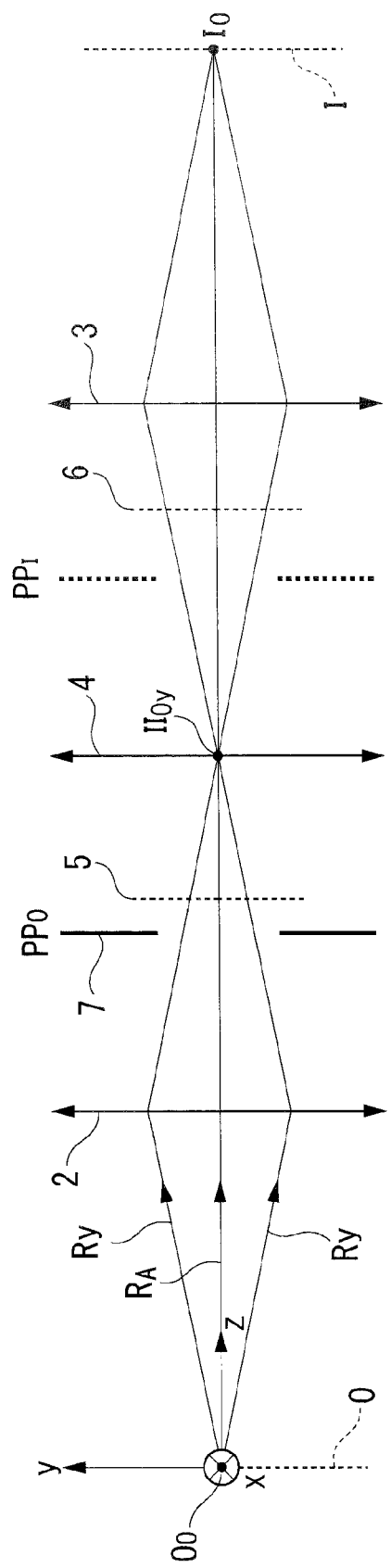
FIG. 13B is a schematic view for explaining the effects of employing the cylindrical lenses in FIG. 12.

The effect of using cylindrical lenses 5 and 6 as the phase modulators will be described below in detail. FIG. 13A and FIG. 13B show an example in which the cylindrical lenses 5 and 6 are used as the phase modulators in FIGS. 2 and 3.

Here, the following conditions are set in particular.
(a) A cylindrical lens having a power $\psi_{Ox}$ in the X-direction is used as the object-O-side phase modulator (wavefront disturbing device) 5.
(b) A cylindrical lens having a power $\psi_{Ix}$ in the X-direction is used as the image-I-side phase modulator (wavefront restoring device) 6.
(c) A position (ray height) of an on-axis ray $R_x$ on the X-Z plane in the cylindrical lens 5 is assumed to be $x_O$.
(d) A position (ray height) of an on-axis ray $R_x$ on the X-Z plane in the cylindrical lens 6 is assumed to be $x_I$.

In FIG. 13A and FIG. 13B, reference signs $II_{OX}$ and $II_{OY}$ indicate intermediate images.

Before describing the effects of this example, the relationship between the phase modulation level and the optical power based on Gaussian optics will be described by using FIG. 14.

Figure 14:
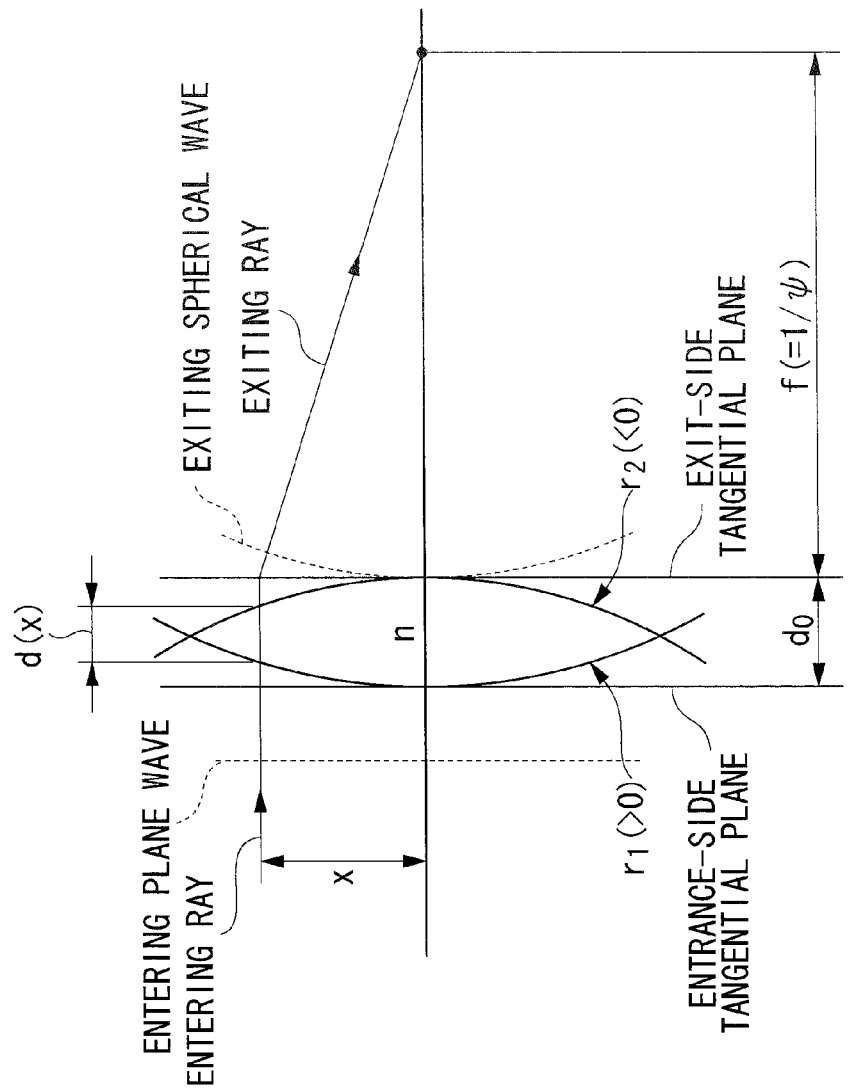
FIG. 14 is a diagram for explaining the relationship between the phase modulation level and the optical power based on the Gaussian optics used for explaining FIG. 13A and FIG. 13B.

In FIG. 14, assuming that the lens thickness at the height (distance from the optical axis) x is d(x) and that the lens thickness at the height 0 (on the optical axis) is $d_0$, the optical-path length L(x) between the entrance-side tangential plane and the exit-side tangential plane extending along a ray at the height x is expressed by Expression (4) below.

$$L(x)=(d0-d(x))+n \cdot d(x) \tag{4}$$

The difference between the optical-path length L(x) at the height x and the optical-path length L(0) at the height 0 (on the optical axis) is expressed by Expression (5) below, when the thin-lens approximation is used.

$$L(x)-L(0)=(-x^2/2)(n-1)(1/r_1-1/r_2) \tag{5}$$

Regarding the optical-path-length difference L(x)–L(0) described above, the absolute value thereof is equal to the phase advance of light exiting at the height x relative to light exiting at the height 0, and the sign thereof is reversed. Therefore, the above-described phase advance is expressed by Expression (6) below, which has an opposite sign to Expression (5).

$$L(0)-L(x)=(x^2/2)(n-1)(1/r_1-1/r_2) \tag{6}$$

On the other hand, the optical power ψ of this thin lens is expressed by Expression (7) below.

$$\psi=1/f=(n-1)(1/r_1-1/r_2) \tag{7}$$

Therefore, based on Expressions (6) and (7), the relationship between the phase advance L(0)–L(x) and the optical power ψ is determined by Expression (8) below.

$$L(0)-L(x)=\psi \cdot x^2/2 \tag{8}$$

Here, let us return to describing FIG. 13A and FIG. 13B.

The phase advance $\Delta L_{Oc}$ experienced by the on-axis ray $R_x$ on the X-Z plane in the cylindrical lens 5 relative to an on-axis principal ray, that is, a ray $R_A$ traveling along the optical axis, is expressed by Expression (9) below based on Expression (8).

$$\Delta L_{Oc}(x_O)=L_{Oc}(0)-L_{Oc}(x_O)=\psi_{Ox} \cdot x_O^2/2 \tag{9}$$

Here, $L_{Oc}(x_O)$ is a function of the optical-path length between the entrance-side tangential plane and the exit-side tangential plane, extending along a ray at the height $x_O$ in the cylindrical lens 5.

Similarly, the phase advance $\Delta L_{Ic}$ experienced by the on-axis ray $R_x$ on the X-Z plane in the cylindrical lens 6 relative to the on-axis principal ray, that is, the ray $R_A$ traveling along the optical axis, is expressed by Expression (10) below.

$$\Delta L_{Ic}(x_I)=L_{Ic}(0)-L_{Ic}(x_I)=\psi_{Ix} \cdot x_I^2/2 \tag{10}$$

Here, $L_{Ic}(x_I)$ is a function of the optical-path length between the entrance-side tangential plane and the exit-side tangential plane, extending along a ray at the height $x_I$ in the cylindrical lens 6.

When the relationships expressed in Expressions (9) and (10) and $(x_I/x_O)^2=\beta_F^2$ are applied to the above-described Expression (2), in this example, conditions for the cylindrical lens 5 to perform the function of disturbing a wavefront and those for the cylindrical lens 6 to perform the function of restoring a wavefront are determined as indicated by Expression (11).

$$\psi_{Ox}/\psi_{Ix}=-\beta_F^2 \tag{11}$$

Specifically, it is necessary that the values of $\psi_{Ox}$ and $\psi_{Ix}$ have signs that are opposite from each other, and, also, that the ratio of their absolute values is proportional to the square of the lateral magnification of the field lens 4.

Note that, although the above descriptions are based on the on-axis ray, so long as the above-described conditions are satisfied, the cylindrical lenses 5 and 6 also perform the functions of disturbing a wavefront and restoring a wavefront in a similar manner for an off-axis ray.

Figure 15:
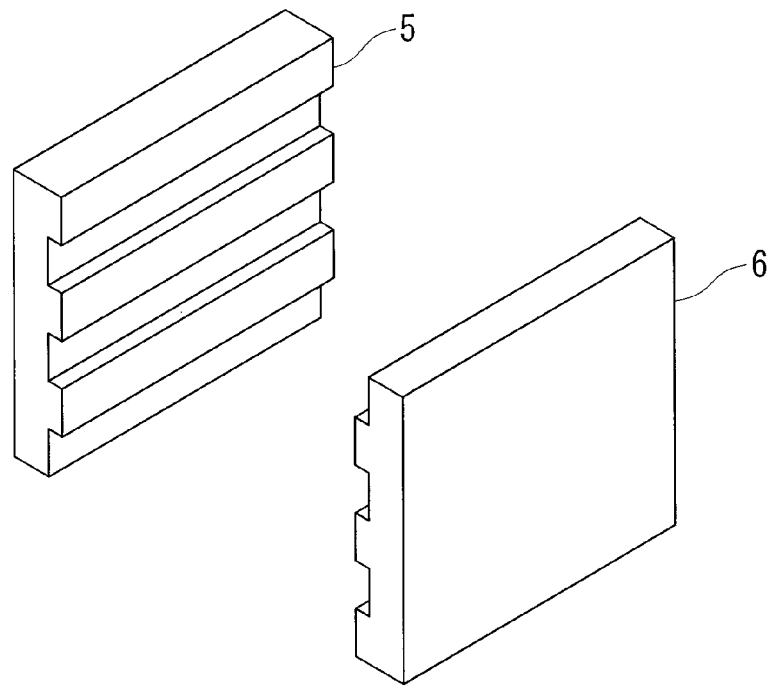
FIG. 15 is a perspective view showing binary diffraction gratings as other examples of the phase modulators used in the image-forming optical system and the observation apparatus of the present invention.
Figure 16:
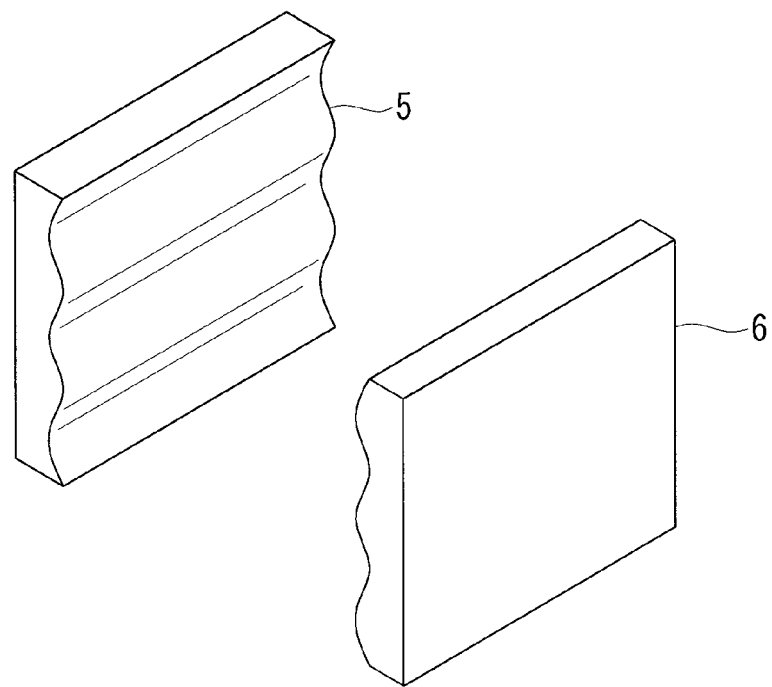
FIG. 16 is a perspective view showing one-dimensional sine-wave diffraction gratings as other examples of the phase modulators used in the image-forming optical system and the observation apparatus of the present invention.
Figure 17:
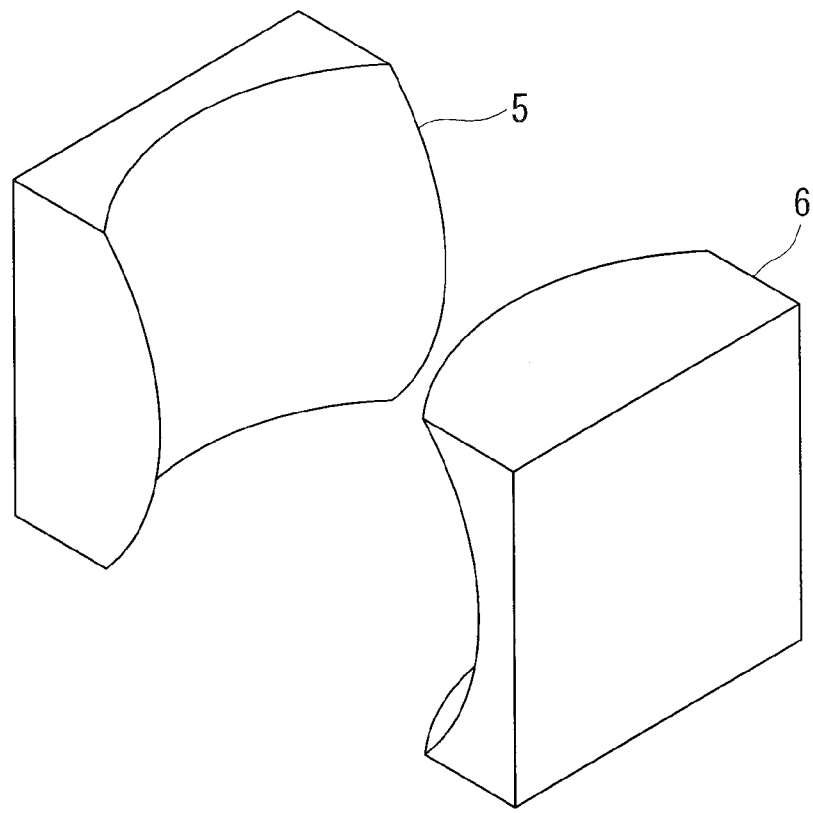
FIG. 17 is a perspective view showing free-curved surface lenses as other examples of the phase modulators used in the image-forming optical system and the observation apparatus of the present invention.
Figure 18:
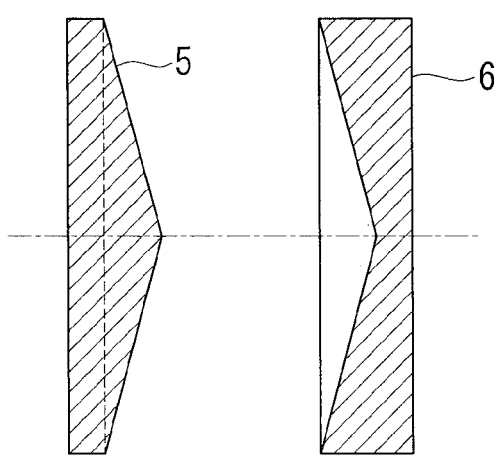
FIG. 18 is a longitudinal sectional view showing conical lenses as other examples of the phase modulators used in the image-forming optical system and the observation apparatus of the present invention.
Figure 19:
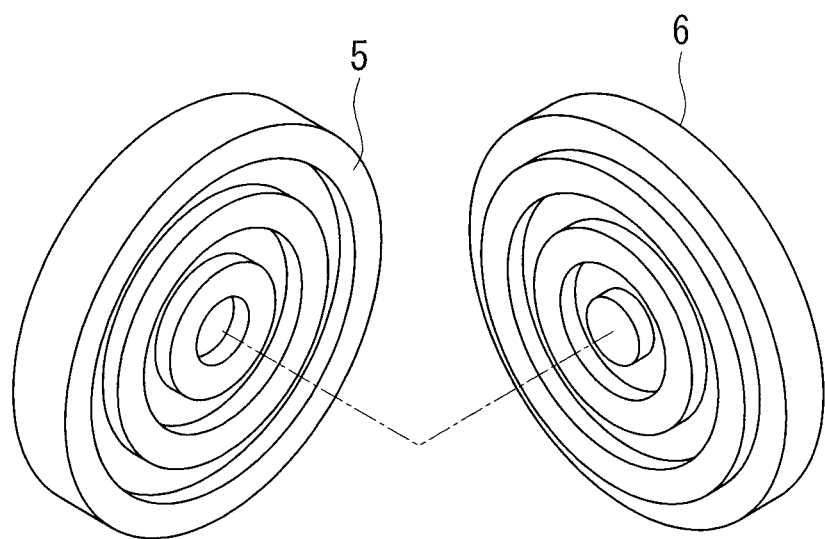
FIG. 19 is a perspective view showing concentric binary diffraction gratings as other examples of the phase modulators used in the image-forming optical system and the observation apparatus of the present invention.

In addition, as the phase modulators 5, 6, 17, and 23 (displayed in figures as the phase modulators 5 and 6), one-dimensional binary diffraction gratings shown in FIG. 15, one-dimensional sine-wave diffraction gratings shown in FIG. 16, free-curved surface lenses shown in FIG. 17, conical lenses shown in FIG. 18, or concentric binary diffraction gratings shown in FIG. 19 may be employed instead of cylindrical lenses. The concentric diffraction gratings are not limited to the binary type, and an arbitrary form, such as the blazed type, the sine-wave type, or the like, can be employed.

Here, the case in which the diffraction gratings 5 and 6 are employed as phase modulators will be described below in detail.

In an intermediate image II in this case, a single point image is separated into a plurality of point images by diffraction. Due to this effect, the intermediate image II is made unsharp, and thus, it is possible to prevent images of foreign objects in the intermediate-image-forming plane from appearing in the final image by being superimposed thereon.

Figure 20:
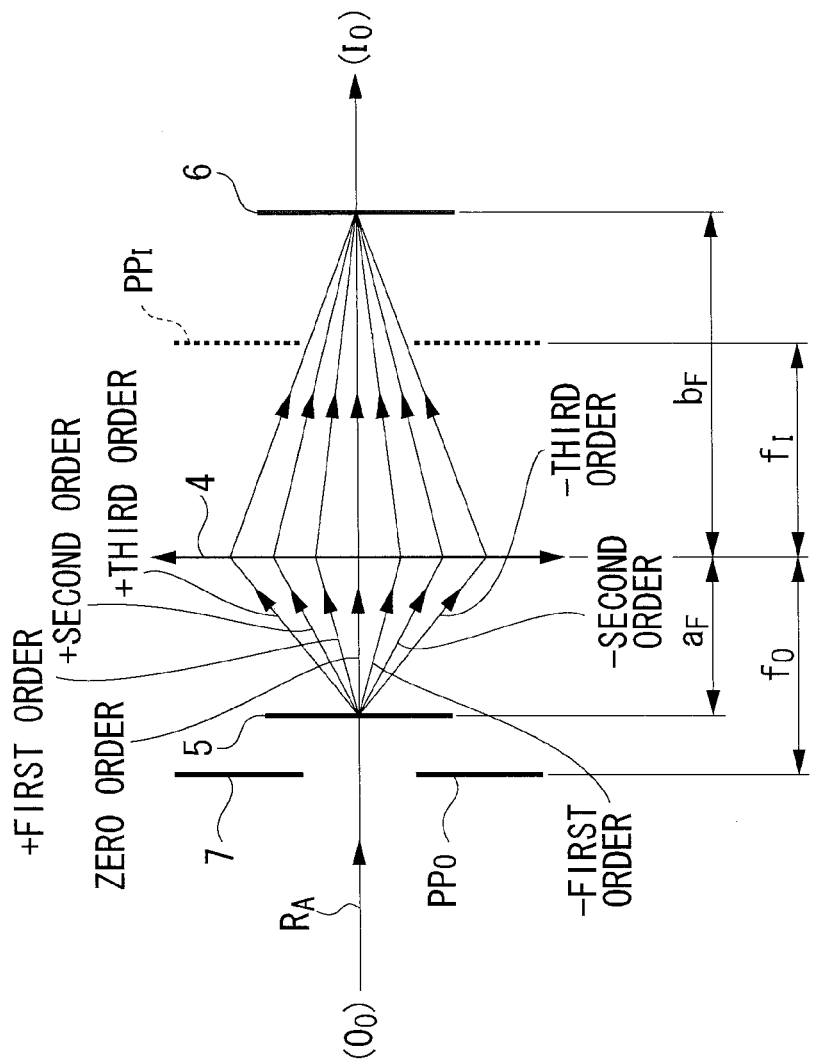
FIG. 20 is a schematic view for explaining the effects of a ray traveling along the optical axis when the diffraction gratings are used as the phase modulators.
Figure 21:
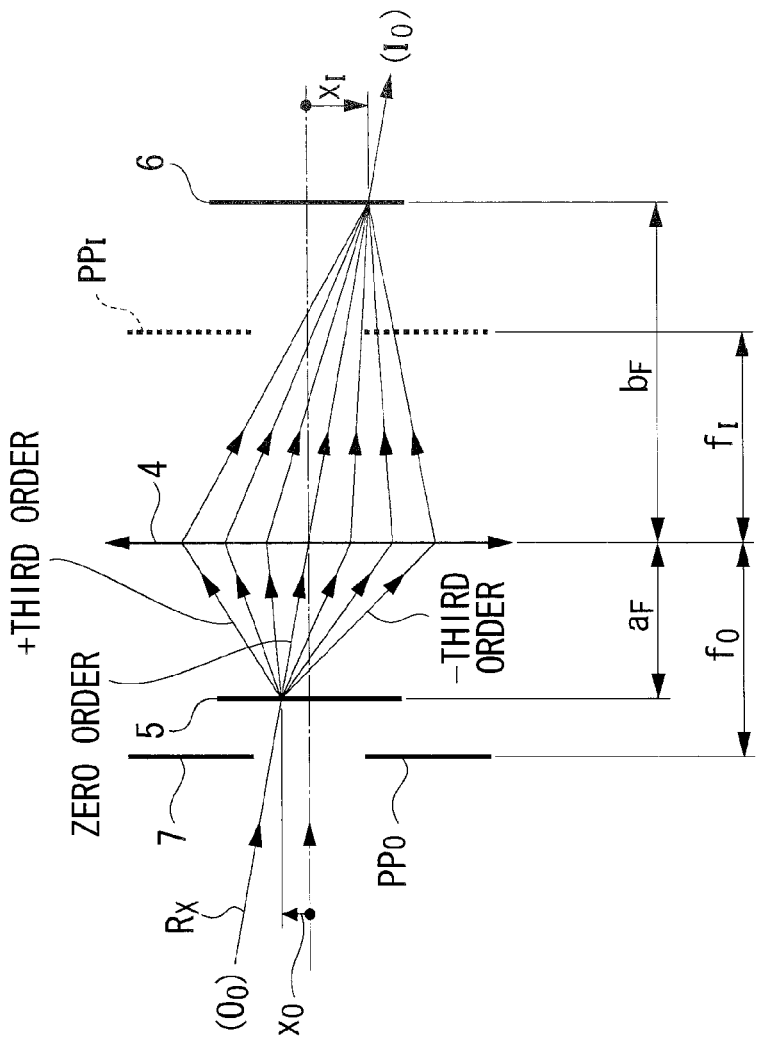
FIG. 21 is a schematic view for explaining the effects of on-axis rays when the diffraction gratings are used as the phase modulators.

For the case in which the diffraction gratings 5 and 6 are employed as phase modulators, an example of a preferable route for an on-axis principal ray, that is, the ray $R_A$ traveling along the optical axis, is shown in FIG. 20, and, in addition, an example of a preferable route for the on-axis ray $R_X$ is shown in FIG. 21. In these figures, although the rays $R_A$ and $R_X$ are separated into a plurality of diffracted rays via the diffraction grating 5, they are restored into a single ray, as was originally the case, by passing through the diffraction grating 6.

In this case also, by satisfying the above-described Expressions (1) to (3), it is possible to achieve the above-described effects.

Here, following FIGS. 20 and 21, it is possible to describe Expression (2) in a different manner such that "the sum of phase modulations the diffraction gratings 5 and 6 apply to a single on-axis ray $R_X$ is always equal to the sum of phase modulations the diffraction gratings 5 and 6 apply to the on-axis principal ray $R_A$".

In addition, in the case in which the diffraction gratings 5 and 6 have periodic structures, if the shapes (that is, phase modulation properties) thereof satisfy Expression (2) in a region corresponding to one period, it is possible to assume that Expression (2) is similarly satisfied in other regions.

Figure 22:
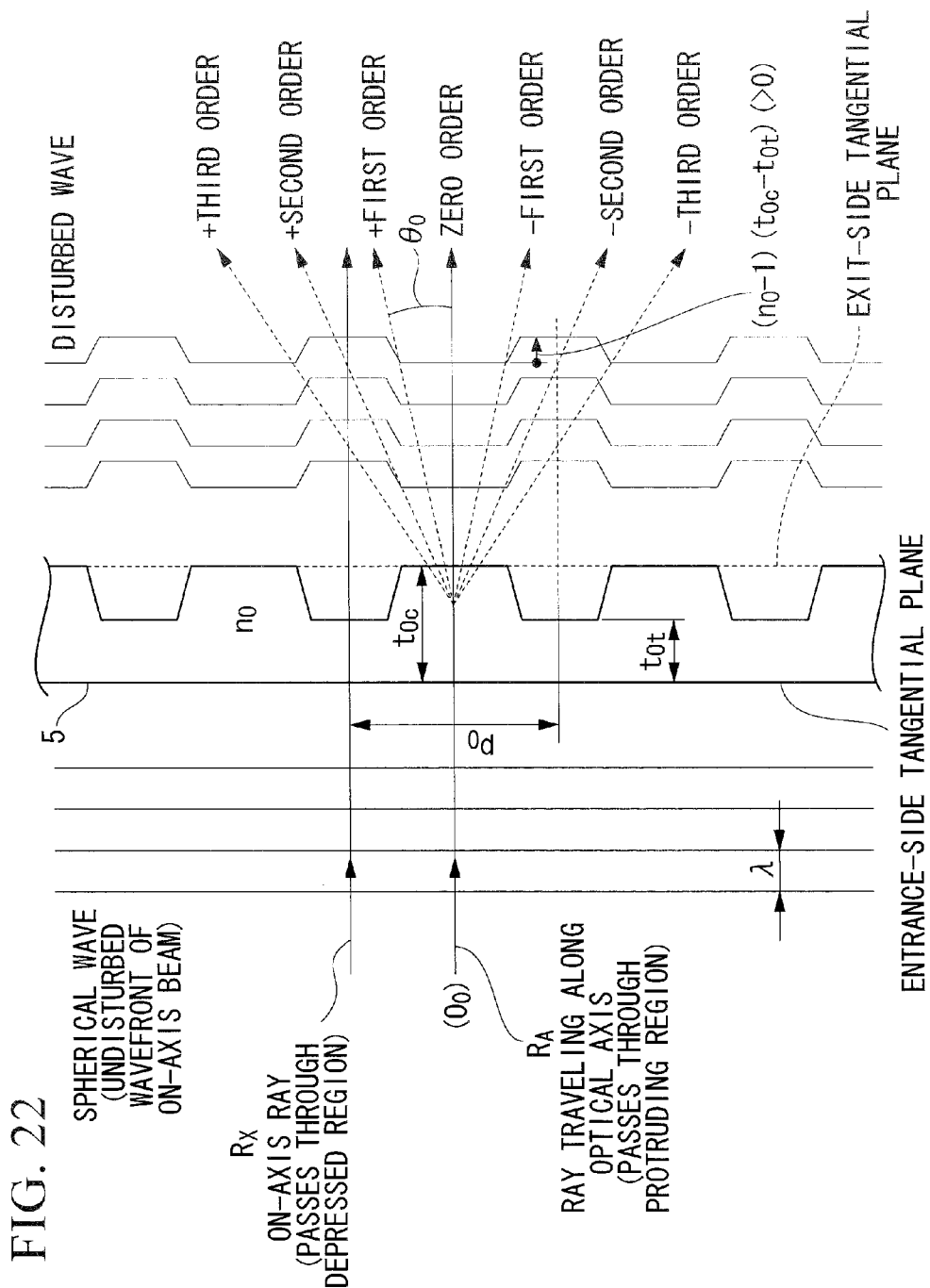
FIG. 22 is a diagram showing details of a center portion for explaining the effects of a diffraction grating that serves as a wavefront disturbing device.
Figure 23:
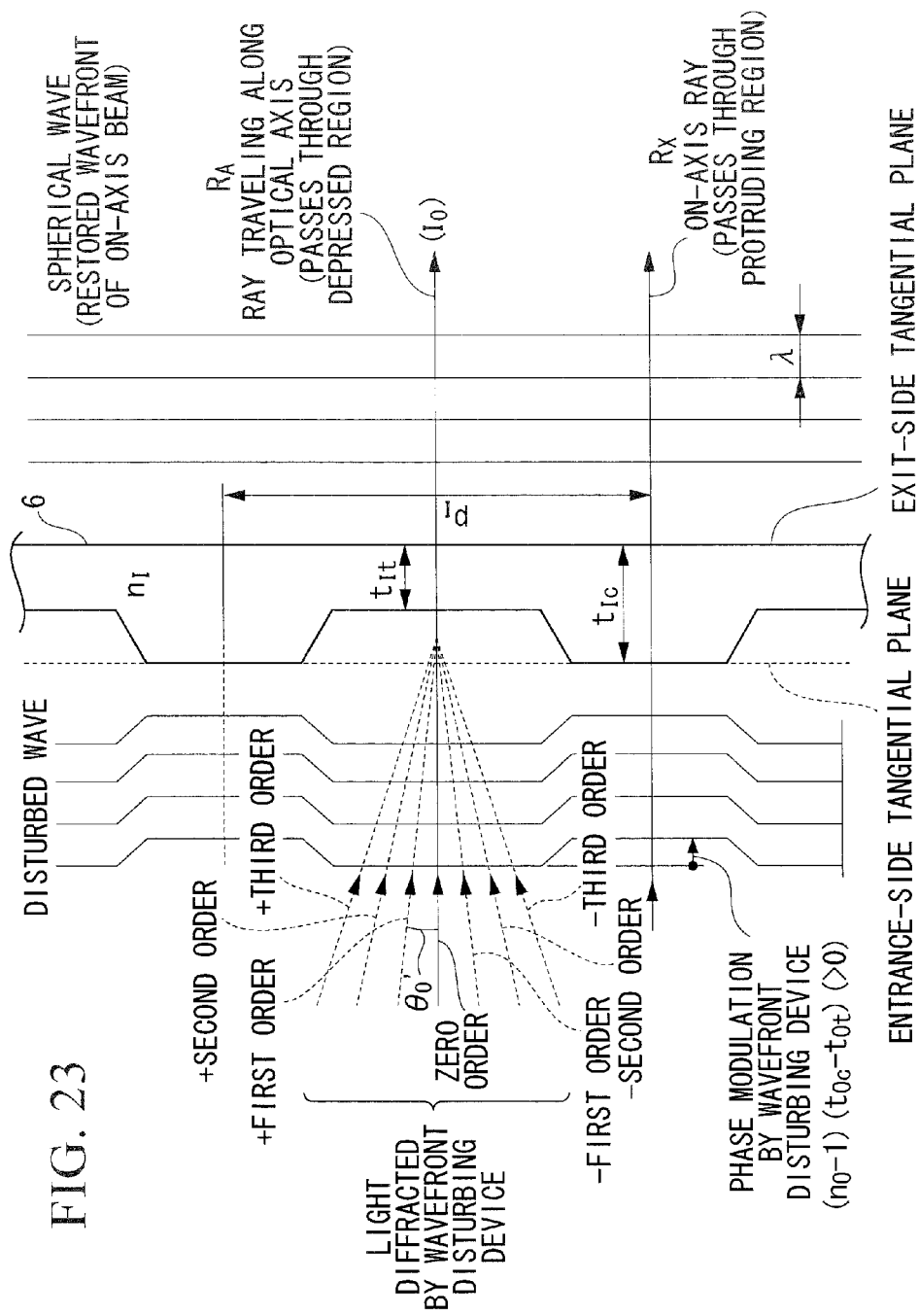
FIG. 23 is a diagram showing the details of the center portion for explaining the effects of a diffraction grating that serves as a wavefront restoring device.

Therefore, center portions of the diffraction gratings 5 and 6, that is, regions in the vicinity of the optical axis, will be focused on in the following description. FIG. 22 is a diagram showing details of the center portion of the diffraction grating 5, and FIG. 23 is a diagram showing details of the center portion of the diffraction grating 6.

Here, the following descriptions are the conditions for the diffraction gratings 5 and 6 to satisfy Expression (2).

Specifically, a modulation period $p_I$ of the diffraction grating 6 must be equal to a modulation period $p_O$ of the diffraction grating 5 projected by the field lens 4; a modulation phase of the diffraction grating 6 must be reversed with respect to a modulation phase of the diffraction grating 5 projected by the field lens 4; and, also, the magnitude of the phase modulation by the diffraction grating 6 and the magnitude of the phase modulation by the diffraction grating 5 must be equal to each other in terms of absolute values.

First, the conditions for the period $p_I$ and the projected period $p_O$ to be equal to each other are expressed by Expression (12).

$$p_I = |\beta_F| \cdot p_O \quad (12)$$

Next, in order for the modulation phase of the diffraction grating 6 to be reversed with respect to the projected modulation phase of the diffraction grating 5, in addition to satisfying the above-described Expression (12), for example, the diffraction grating 5 needs to be disposed so that one of the centers of protruding regions thereof is aligned with the optical axis and also the diffraction grating 6 needs to be disposed so that one of the centers of depressed regions thereof is aligned with the optical axis. FIGS. 22 and 23 show merely one example of such arrangements.

Finally, conditions for the magnitude of the phase modulation by the diffraction grating 6 and the magnitude of the phase modulation by the diffraction grating 5 to be equal to each other in terms of absolute values thereof are determined.

Based on optical parameters (the thickness $t_{Oc}$ of the protruding regions, the thickness $t_{Ot}$ of the depressed regions, and the refractive index $n_O$) of the diffraction grating 5, a phase advance $\Delta L_{Odt}$ experienced by the on-axis ray $R_X$ that passes through one of the depressed regions of the diffraction grating 5 relative to the ray $R_A$ that travels along the optical axis (that passes through one of the protruding regions) is expressed by Expression (13) below.

$$\Delta L_{Odt} = n_O \cdot t_{Oc} - (n_O \cdot t_{Ot} + (t_{Oc} - t_{Ot})) \quad (13)$$

$$= (n_O - 1)(t_{Oc} - t_{Ot})$$

Similarly, based on optical parameters (the thickness $t_{Ic}$ of the protruding regions, the thickness $t_{It}$ of the depressed regions, and the refractive index $n_I$) of the diffraction grating 6, a phase advance $\Delta L_{Idt}$ experienced by the on-axis ray $R_X$ that passes through one of the protruding regions of the diffraction grating 6 relative to the ray $R_A$ that travels along the optical axis (that passes through one of the depressed regions) is expressed by Expression (14) below.

$$\Delta L_{Idt} = (n_I \cdot t_{It} + (t_{Ic} - t_{It})) - n_I \cdot t_{Ic} \quad (14)$$

$$= -(n_I - 1)(t_{Ic} - t_{It})$$

In this case, because the value of $\Delta L_{Odt}$ is positive and the value of $\Delta L_{Idt}$ is negative, the condition for the absolute values of the two to be equal to each other is expressed by Expression (15) below.

$$\Delta L_{Odt} + \Delta L_{Idt} = (n_O - 1)(t_{Oc} - t_{Ot}) - (n_I - 1)(t_{Ic} - t_{It}) = 0 \quad (15)$$

Note that, although the above descriptions are based on the on-axis ray, so long as the above-described condition is satisfied, the diffraction grating 5 performs the function of disturbing a wavefront, and the diffraction grating 6 also performs the function of restoring a wavefront for an off-axis ray also.

In addition, although the cross-sectional shape of the diffraction gratings 5 and 6 is assumed to be trapezoidal in the above descriptions, it is needless to say that similar functions can also be performed with other shapes.

Figure 24:
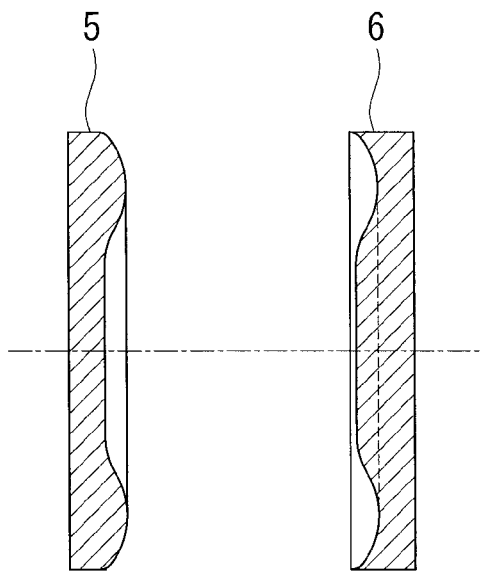
FIG. 24 is a longitudinal sectional view showing spherical aberration devices as other examples of the phase modulators used in the image-forming optical system and the observation apparatus of the present invention.
Figure 25:
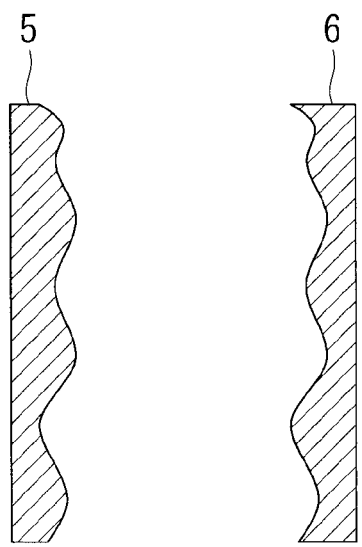
FIG. 25 is a longitudinal sectional view showing irregular-shaped devices as other examples of the phase modulators used in the image-forming optical system and the observation apparatus of the present invention.
Figure 26:
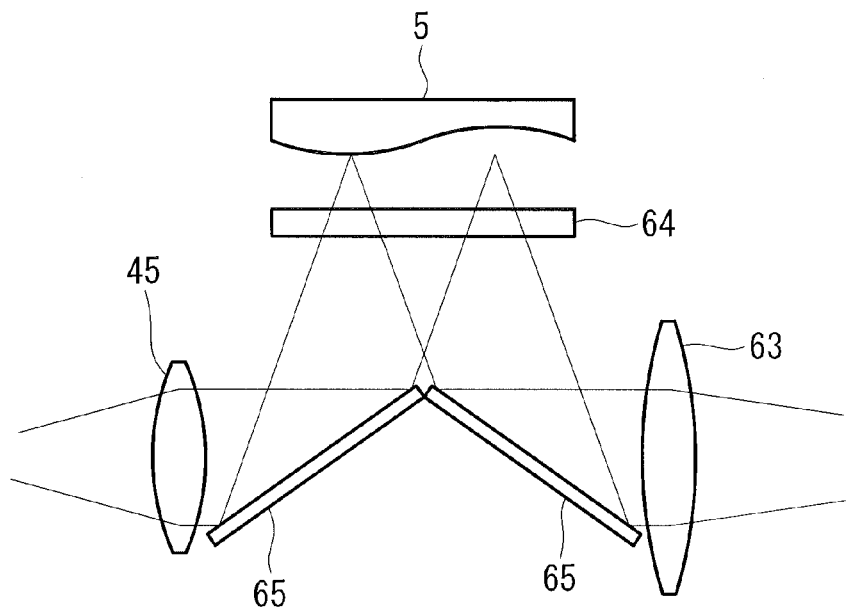
FIG. 26 is a schematic view showing reflecting-type phase modulators as other examples of the phase modulators used in the image-forming optical system and the observation apparatus of the present invention.
Figure 27:
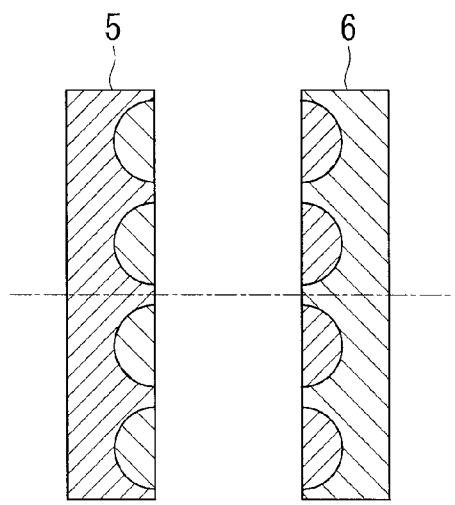
FIG. 27 is a schematic view showing gradient-index devices as other examples of the phase modulators used in the image-forming optical system and the observation apparatus of the present invention.

Furthermore, as the phase modulators 5 and 6, spherical aberration devices shown in FIG. 24, irregular-shaped devices shown in FIG. 25, reflecting-type wavefront modulating devices in a combination with the transmitting-type spatial light modulator 64 shown in FIG. 26, or gradient-index devices shown in FIG. 27 may be employed.

Additionally, as the phase modulators 5 and 6, a fly-eye lens or a microlens array, in which numerous minute lenses are arrayed, or a microprism array, in which numerous minute prisms are arrayed, may be employed.

Figure 28:
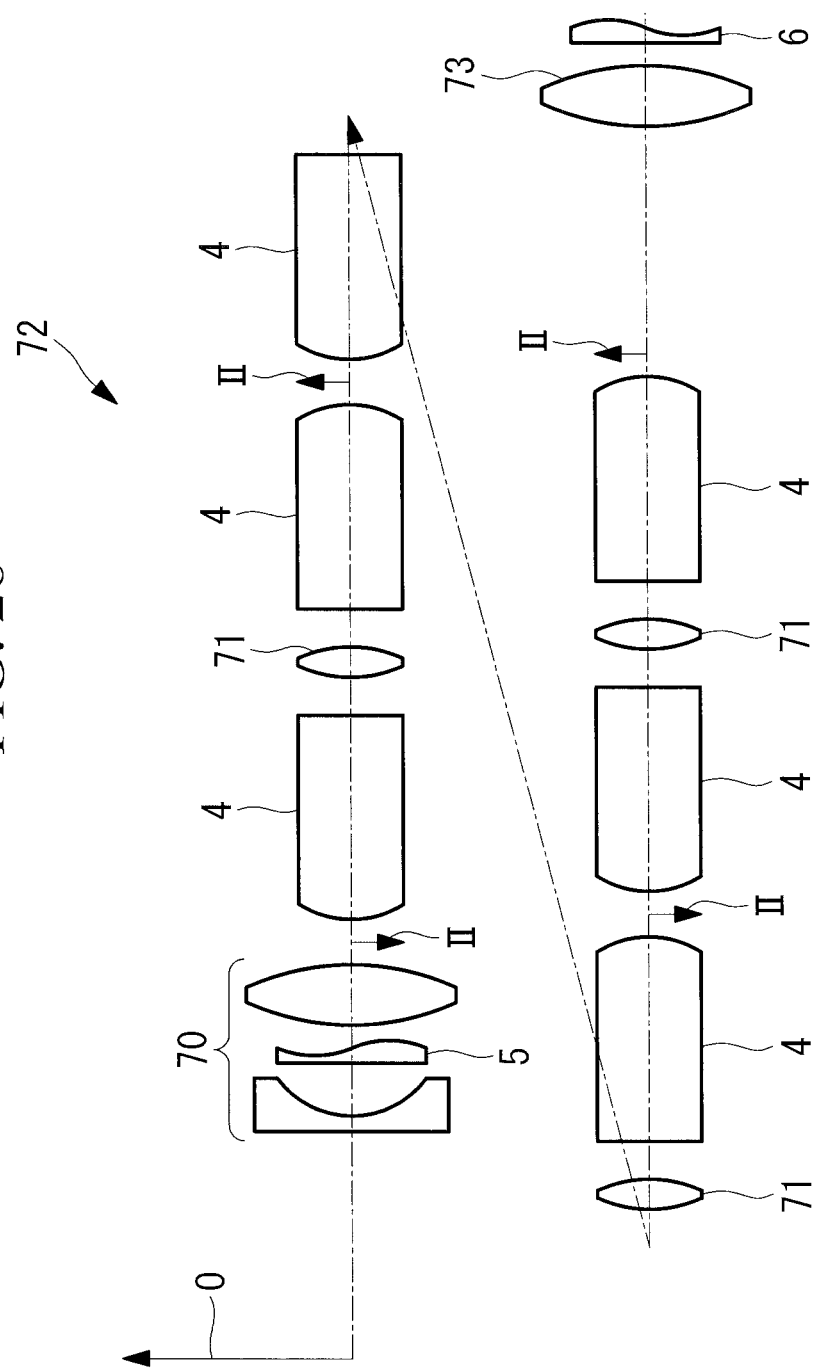
FIG. 28 is a diagram showing an example lens array for the case in which the image-forming optical system of the present invention is applied to an endoscope.

In addition, in the case in which the image-forming optical systems 1 according to the above-described embodiments are applied to endoscopes, as shown in FIG. 28, a wavefront disturbing device 5 needs to be disposed inside the objective lens (image-forming lens) 70, and a wavefront restoring device 6 needs to be disposed in the vicinity of an ocular lens 73 that is positioned on the opposite side from the objective lens 70 with a relay optical system 72 that includes a plurality of field lenses 4 and focusing lenses 71 placed therebetween. By doing so, it is possible to make intermediate images formed in the vicinity of the surfaces of the field lenses 4 unsharp, and it is possible to make the final image formed by the ocular lens 73 sharp.

Figure 29:
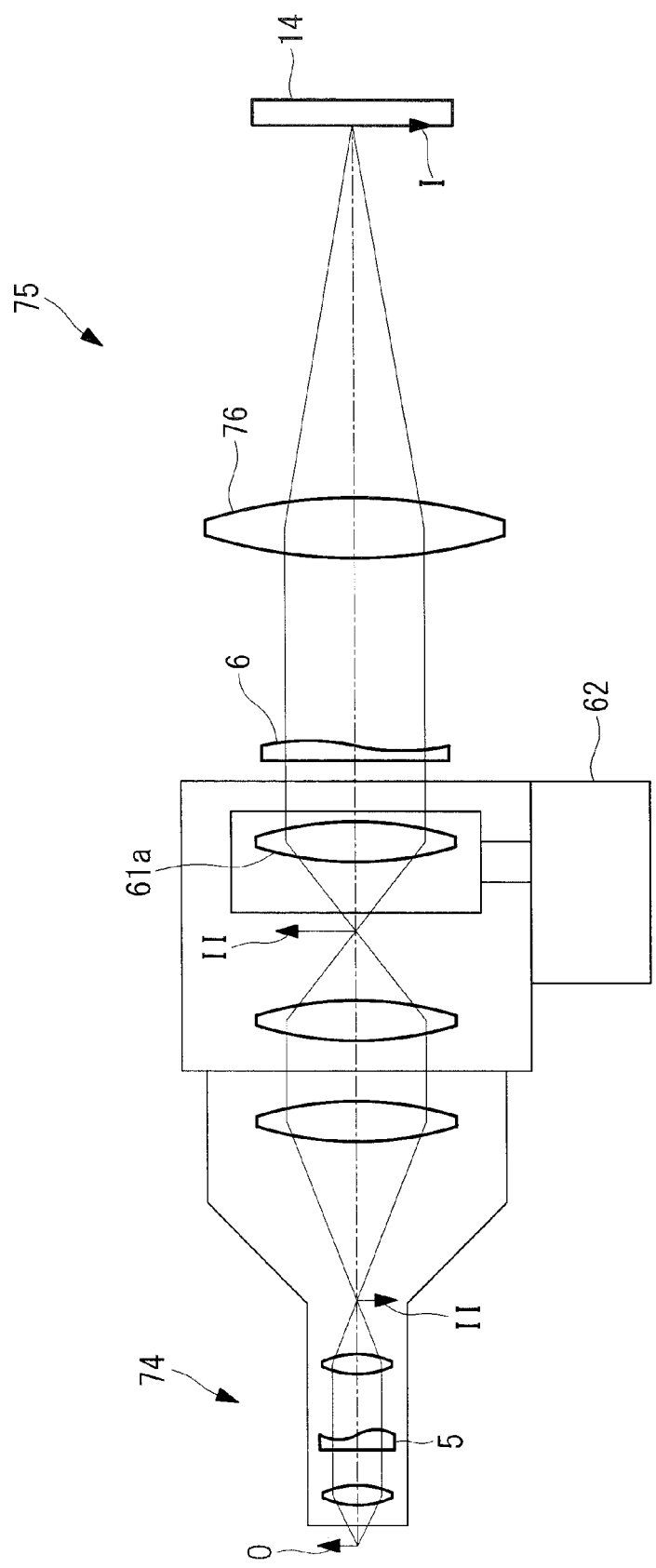
FIG. 29 is a diagram showing an example lens array for the case in which the image-forming optical system of the present invention is applied to a microscope provided with an endoscope-type small-diameter objective lens including an inner focusing function.

In addition, as shown in FIG. 29, the wavefront disturbing device 5 may be provided in an endoscope-type small-diameter objective lens 74 including an inner focusing function, in which a lens 61a is driven by an actuator 62, and the wavefront restoring device 6 may be disposed in the vicinity of the pupil position of a tube lens (image-forming lens) 76 provided in a microscope main unit 75.

According to the above embodiment, following aspects can be introduced.

An aspect of the present invention is an image-forming optical system including a plurality of image-forming lenses that form a final image and at least one intermediate image; a first phase modulator that is disposed closer to an object than any one of the intermediate images formed by the image-forming lenses and that applies a spatial disturbance to a wavefront of light coming from the object; and a second phase modulator that is disposed at a position that sandwiches at least one of the intermediate images with the first phase modulator and that cancels out the spatial disturbance applied to the wavefront of the light coming from the object by the first phase modulator.

With this aspect, the light that has entered the image-forming lenses from the object side is focused by the image-forming lenses, thus forming the final image. In this case, by passing through the first phase modulator, which is disposed closer to the object than one of the intermediate images, a spatial disturbance is applied to the wavefront of the light, and thus, the intermediate image that is formed is made unclear. In addition, the light that has formed the intermediate image passes through the second phase modulator, and thus, the spatial disturbance applied to the wavefront thereof by the first phase modulator is cancelled out. By doing so, in the final-image formation, which is performed after the light passes through the second phase modulator, it is possible to acquire a sharp image.

Specifically, by making the intermediate image unclear, even if some optical element is disposed at the intermediate-image position, and blemishes, foreign objects, defects, or the like exist on the surface of or inside this optical element, it is possible to prevent the occurrence of a problem whereby the blemishes, foreign objects, defects, or the like are superimposed on the intermediate image and are included as part of the finally formed final image.

In the above-described aspect, the first phase modulator and the second phase modulator may be disposed in a vicinity of pupil positions of the image-forming lenses.

By doing so, the sizes of the first phase modulator and the second phase modulator can be reduced by disposing them in the vicinity of the pupil positions where beams do not change.

In addition, the above-described aspect may be provided with an optical-path-length varying part that can vary an optical-path length between the two image-forming lenses disposed at positions that sandwich any one of the intermediate images.

By doing so, by changing the optical-path length between the two image-forming lenses by actuating the optical-path-length varying means, it is possible to easily change the image-forming position of the final image in the optical-axis direction.

In addition, in the above-described aspect, the optical-path-length varying part may be provided with a flat mirror that is disposed perpendicularly to an optical axis and that reflects light that forms the intermediate images so as to fold back the light; an actuator that moves the flat mirror in an optical-axis direction; and a beam splitter that splits the light reflected by the flat mirror into light in two directions.

By doing so, the light coming from the object side, which is collected by the object-side image-forming lens, is reflected by the flat mirror to be folded back and is subsequently split by the beam splitter, thus being made to enter the image-side image-forming lens. In this case, by moving the flat mirror in the optical-axis direction by actuating the actuator, it is possible to easily change the optical-path length between the two image-forming lenses, and thus, it is possible to easily change the image-forming position of the final image in the optical-axis direction.

In addition, the above-described aspect may be provided with a variable spatial phase modulator that is disposed in a vicinity of a pupil position of any one of the image-forming lenses, and that changes a position of the final image in the optical-axis direction by changing a spatial phase modulation to be applied to the wavefront of the light.

By doing so, it is possible to apply a spatial phase modulation to the wavefront of the light such that the final-image position is changed in the optical-axis direction by means of the variable spatial phase modulator, and it is possible to easily change the image-forming position of the final image in the optical-axis direction by adjusting the phase modulation to be applied.

In addition, in the above-described aspect, a function of at least one of the first phase modulator and the second phase modulator may be performed by the variable spatial phase modulator.

By doing so, it is possible to make the variable spatial phase modulator bear the function of applying a spatial phase modulation that changes the final-image position in the optical-axis direction and a phase modulation that makes the intermediate image unclear or a phase modulation that cancels out the unclearness of the intermediate image. By doing so, it is possible to form an image-forming optical system with a simple configuration by reducing the number of components.

In addition, in the above-described aspect, the first phase modulator and the second phase modulator may apply, to a wavefront of a beam, phase modulations that change in a one-dimensional direction perpendicular to an optical axis.

By doing so, it is possible to make the intermediate image unclear by applying, to the wavefront of the light, the phase modulation that changes in a one-dimensional direction perpendicular to the optical axis by using the first phase modulator, and, even if some optical element is disposed at the intermediate-image position and blemishes, foreign objects, defects, or the like exist on the surface of or inside this optical element, it is possible to prevent the occurrence of a problem whereby the blemishes, foreign objects, defects, or the like are superimposed on the intermediate image and are included as part of the finally formed final image. In addition, it is possible to form a sharp final image without blurriness by applying, to the wavefront of the light, the phase modulation that cancels out the phase modulation that has changed in the one-dimensional direction by using the second phase modulator.

In addition, in the above-described aspect, the first phase modulator and the second phase modulator may apply, to a wavefront of a beam, phase modulations that change in two-dimensional directions perpendicular to an optical axis.

By doing so, it is possible to more reliably make the intermediate image unclear by applying, to the wavefront of the light, the phase modulation that changes in the two-dimensional directions perpendicular to the optical axis by using the first phase modulator. In addition, it is possible to form a sharper final image by applying, to the wavefront of the light, the phase modulation that cancels out the phase modulation that has changed in the two-dimensional directions by using the second phase modulator.

In addition, in the above-described aspect, the first phase modulator and the second phase modulator may be transmitting-type devices that apply phase modulations to a wavefront of light when allowing the light to pass therethrough.

In addition, in the above-described aspect, the first phase modulator and the second phase modulator may be reflecting-type devices that apply phase modulations to a wavefront of light when reflecting the light.

In addition, in the above-described aspect, the first phase modulator and the second phase modulator may have complementary shapes.

By doing so, it is possible to employ simple configurations in the first phase modulator that applies, to the wavefront, the spatial disturbance that makes the intermediate image unclear and the second phase modulator that applies the phase modulation that cancels out the spatial disturbance applied to the wavefront.

In addition, in the above-described aspect, the first phase modulator and the second phase modulator may apply phase modulations to a wavefront by using a refractive-index distribution of a transparent material.

By doing so, it is possible to generate a wavefront disturbance in accordance with the refractive-index distribution when the light passes through the first phase modulator, and it is possible to apply, to the wavefront of the light, the phase modulation that cancels out the wavefront disturbance by using the refractive-index distribution when the light passes through the second phase modulator.

In addition, another aspect of the present invention is an illumination apparatus including any one of the above-described image-forming optical systems and a light source that is disposed on an object side of the image-forming optical system and that generates illumination light to be made to enter the image-forming optical system.

With this aspect, by making the illumination light emitted from the light source disposed on the object side enter the image-forming optical system, the object to be illuminated, disposed on the final-image side, can be illuminated by the illumination light. In this case, because the intermediate image formed by the image-forming optical system is made unclear by the first phase modulator, even if some optical element is disposed at the intermediate-image position and blemishes, foreign objects, defects, or the like exist on the surface of or inside this optical element, it is possible to prevent the occurrence of a problem whereby the blemishes, foreign objects, defects, or the like are superimposed on the intermediate image and are included as part of the finally formed final image.

In addition, another aspect of the present invention is an observation apparatus including any one of the above-described image-forming optical systems and a photo-detector that is disposed on a final-image side of the image-forming optical system and that detects light emitted from an observation subject.

With this aspect, with the photo-detector, it is possible to detect a sharp final image that is formed by preventing images of blemishes, foreign objects, defects, or the like on the surface of or inside the optical element from being superimposed on the intermediate image by using the image-forming optical system.

In the above-described aspect, the photo-detector may be disposed at a final-image position in the image-forming optical system and is an image-acquisition device that captures the final image.

By doing so, it is possible to perform high-precision observation by capturing a sharp final image by using the image-acquisition device disposed at the final-image position in the image-forming optical system.

In addition, another aspect of the present invention is an observation apparatus including any one of the above-described image-forming optical systems; a light source that is disposed on an object side of the image-forming optical system and that generates illumination light to be made to enter the image-forming optical system; and a photo-detector that is disposed on a final-image side of the image-forming optical system and that detects light emitted from an observation subject.

With this aspect, the light coming from the light source is focused by the image-forming optical system and is radiated onto the observation subject, and the light generated at the observation subject is detected by the photo-detector that is disposed on the final-image side. By doing so, it is possible to detect a sharp final image with the photo-detector, which is formed by preventing images of blemishes, foreign objects, defects, or the like on the surface of or inside the intermediate optical element from being superimposed on the intermediate image.

The above-described aspect may be provided with a Nipkow-disk-type confocal optical system that is disposed between the light source, and the photo-detector and image-forming optical system.

By doing so, it is possible to acquire a sharp image of the observation subject at high speed by scanning the observation subject with multiple spots of light.

In addition, in the above-described aspect, the light source may be a laser light source, and the photo-detector may be provided with a confocal pinhole and a photoelectric conversion device.

By doing so, it is possible to observe the observation subject by using a sharp confocal image in which images of blemishes, foreign objects, defects, or the like at the intermediate-image position do not appear.

In addition, another aspect of the present invention provides an observation apparatus including the above-described illumination apparatus and a photo-detector that detects light emitted from an observation subject that is illuminated by the illumination apparatus, wherein the light source is a pulsed laser light source.

By doing so, it is possible to observe the observation subject by using a sharp multi-photon-excitation image in which images of blemishes, foreign objects, defects, or the like at the intermediate-image position do not appear.

The present invention affords an advantage in that it is possible to acquire a sharp final image by preventing blemishes, foreign objects, defects, or the like in an optical element from being superimposed on an intermediate image even if the intermediate image is formed at a position coinciding with the optical element.

REFERENCE SIGNS LIST

I final image
II intermediate image
O object
$PP_O$, $PP_I$ pupil position
1, 13, 32, 42 image-forming optical system
2, 3 image-forming lens
5 wavefront disturbing device (first phase modulator)
6 wavefront restoring device (second phase modulator)
10, 30, 40, 50, 60 observation apparatus
11, 31, 41 light source
14, 33 image-acquisition device (photo-detector)
17, 23 phase modulator
20, 36 beam splitter
22 optical-path-length varying means
22a flat mirror
22b actuator
34 Nipkow-disk-type confocal optical system
43 confocal pinhole
44 photo-detector (photoelectric conversion device)
61a lens (optical-path-length varying means)
62 actuator (optical-path-length varying means)
64 spatial light modulator (variable spatial phase modulator)

The invention claimed is:

1. An image-forming optical system comprising:
a plurality of image-forming lenses that form a final image and at least one intermediate image;
a first phase modulator that is disposed closer to an object than any one of the intermediate images formed by the image-forming lenses and that applies a spatial disturbance to a wavefront of light coming from the object; and
a second phase modulator that is disposed at a position that sandwiches at least one of the intermediate images with the first phase modulator and that cancels out the spatial disturbance applied to the wavefront of the light coming from the object by the first phase modulator, wherein the first phase modulator and the second phase modulator are disposed in a vicinity of pupil positions of the image-forming lenses.

2. The image-forming optical system according to claim 1, wherein the first phase modulator and the second phase modulator are disposed at optically conjugate positions.

* * * * *